US012580692B2

(12) United States Patent
Liu et al.

(10) Patent No.: US 12,580,692 B2
(45) Date of Patent: Mar. 17, 2026

(54) FALLBACK OPERATION FOR A SEMI-STATIC HYBRID AUTOMATIC REPEAT REQUEST FEEDBACK CODEBOOK FOR MULTICAST

(71) Applicant: QUALCOMM Incorporated, San Diego, CA (US)

(72) Inventors: Le Liu, San Jose, CA (US); Kazuki Takeda, Minato-ku (JP); Alberto Rico Alvarino, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 473 days.

(21) Appl. No.: 18/150,150

(22) Filed: Jan. 4, 2023

(65) Prior Publication Data

US 2023/0261805 A1     Aug. 17, 2023

Related U.S. Application Data

(60) Provisional application No. 63/267,896, filed on Feb. 11, 2022.

(51) Int. Cl.
| | |
|---|---|
| H04L 1/1829 | (2023.01) |
| H04W 72/232 | (2023.01) |
| H04W 72/30 | (2023.01) |

(52) U.S. Cl.
CPC .......... H04L 1/1864 (2013.01); H04L 1/1854 (2013.01); H04W 72/232 (2023.01); H04W 72/30 (2023.01)

(58) Field of Classification Search
CPC ... H04L 1/1854; H04L 1/1861; H04L 1/1864; H04L 1/1896; H04L 2001/0093; H04W 72/232; H04W 72/30
See application file for complete search history.

(56) References Cited

U.S. PATENT DOCUMENTS

| | | | | |
|---|---|---|---|---|
| 11,245,496 B2 * | 2/2022 | Peng | ...................... | H04W 72/23 |
| 11,528,696 B2 * | 12/2022 | Takeda | .................. | H04W 72/23 |

(Continued)

FOREIGN PATENT DOCUMENTS

| | | | | | |
|---|---|---|---|---|---|
| CN | 109639398 A | * | 4/2019 | ........... | H04L 1/1812 |
| CN | 111788787 A | * | 10/2020 | ............ | H04W 28/06 |

(Continued)

OTHER PUBLICATIONS

International Search Report and Written Opinion—PCT/US2023/060152—ISA/EPO—May 3, 2023.

(Continued)

*Primary Examiner* — Eric Nowlin
(74) *Attorney, Agent, or Firm* — Harrity & Harrity LLP

(57) ABSTRACT

Various aspects of the present disclosure generally relate to wireless communication. In some aspects, a user equipment (UE) may receive, from a network entity, configuration information associated with a semi-static hybrid automatic repeat request (HARQ) feedback codebook for multicast messages. The UE may receive, from the network entity, a physical downlink control channel (PDCCH) message, associated with a radio network temporary identifier (RNTI), scheduling one or more multicast physical downlink shared channel (PDSCH) messages. The UE may transmit, to the network entity, one or more fallback HARQ feedback indications, associated with the one or more multicast PDSCH messages, in lieu of transmitting the semi-static HARQ feedback codebook, in accordance with the configuration information and associated with at least one of the RNTI or a feedback configuration associated with the RNTI. Numerous other aspects are provided.

30 Claims, 10 Drawing Sheets

(56) References Cited

U.S. PATENT DOCUMENTS

| | | | | |
|---|---|---|---|---|
| 11,671,203 | B2 * | 6/2023 | Lee | H04W 4/40 |
| | | | | 370/329 |
| 11,817,960 | B2 * | 11/2023 | Zhou | H04L 1/1607 |
| 11,824,811 | B2 * | 11/2023 | Lei | H04W 28/06 |
| 11,844,094 | B2 * | 12/2023 | Yeo | H04W 48/16 |
| 11,888,592 | B2 * | 1/2024 | Islam | H04L 1/1819 |
| 11,956,798 | B2 * | 4/2024 | Park | H04L 1/1854 |
| 11,963,198 | B2 * | 4/2024 | Zhou | H04L 1/1864 |
| 12,237,930 | B2 * | 2/2025 | Zhou | H04L 1/1607 |
| 12,284,134 | B2 * | 4/2025 | Lei | H04W 28/06 |
| 12,426,065 | B2 * | 9/2025 | Takahashi | H04L 1/1607 |
| 2020/0213044 | A1 * | 7/2020 | Peng | H04L 1/1864 |
| 2021/0006378 | A1 * | 1/2021 | Lei | H04L 5/0055 |
| 2021/0250134 | A1 * | 8/2021 | Islam | H04B 7/0626 |
| 2021/0344455 | A1 * | 11/2021 | Choi | H04W 72/0446 |
| 2022/0007399 | A1 * | 1/2022 | Rastegardoost | H04L 5/0073 |
| 2022/0046588 | A1 * | 2/2022 | Yeo | H04W 72/23 |
| 2022/0052792 | A1 * | 2/2022 | Lee | H04W 4/06 |
| 2022/0124783 | A1 * | 4/2022 | Park | H04W 72/121 |
| 2023/0071767 | A1 * | 3/2023 | Zhou | H04L 1/1896 |
| 2023/0209313 | A1 * | 6/2023 | Chin | H04W 4/06 |
| | | | | 370/329 |
| 2023/0232430 | A1 * | 7/2023 | Zhou | H04L 12/1868 |
| | | | | 370/312 |
| 2023/0239078 | A1 * | 7/2023 | Yang | H04L 1/1887 |
| | | | | 370/329 |
| 2023/0247649 | A1 * | 8/2023 | Takahashi | H04L 1/1607 |
| | | | | 370/329 |
| 2023/0403759 | A1 * | 12/2023 | Li | H04W 76/40 |
| 2023/0412347 | A1 * | 12/2023 | Li | H04L 1/1812 |
| 2024/0056776 | A1 * | 2/2024 | Elmali | H04L 1/1861 |
| 2024/0080141 | A1 * | 3/2024 | Zhou | H04L 1/1854 |
| 2024/0178974 | A1 * | 5/2024 | Lei | H04L 1/1607 |
| 2024/0259144 | A1 * | 8/2024 | Yao | H04W 72/21 |
| 2024/0260048 | A1 * | 8/2024 | Park | H04L 1/1812 |
| 2024/0260062 | A1 * | 8/2024 | Zhou | H04L 1/1896 |
| 2024/0275526 | A1 * | 8/2024 | Elmali | H04L 1/1893 |
| 2024/0305417 | A1 * | 9/2024 | Huschke | H04L 1/1854 |
| 2024/0340149 | A1 * | 10/2024 | Lei | H04L 5/0055 |
| 2024/0388408 | A1 * | 11/2024 | Liu | H04L 5/0055 |
| 2024/0422021 | A1 * | 12/2024 | Lei | H04L 5/0055 |

FOREIGN PATENT DOCUMENTS

| | | | | | |
|---|---|---|---|---|---|
| CN | 109639398 | B | * | 12/2021 | H04W 72/23 |
| CN | 111788787 | B | * | 10/2022 | H04L 1/1864 |
| CN | 118592001 | A | * | 9/2024 | H04L 1/1854 |
| EP | 3657721 | A1 | * | 5/2020 | H04L 1/1812 |
| EP | 3657721 | B1 | * | 9/2021 | H04W 72/23 |
| EP | 4221023 | A1 | * | 8/2023 | H04L 1/1607 |
| EP | 3753153 | B1 | * | 4/2025 | H04W 28/06 |
| ES | 3020409 | T3 | * | 5/2025 | H04W 28/06 |
| WO | WO-2019072074 | A1 | * | 4/2019 | H04L 5/0055 |
| WO | WO-2019157658 | A1 | * | 8/2019 | H04L 1/1607 |
| WO | WO-2022031085 | A1 | * | 2/2022 | H04W 72/30 |
| WO | WO-2023154582 | A1 | * | 8/2023 | H04L 1/1896 |

OTHER PUBLICATIONS

Moderator (Huawei) : "FL Summary#3 on Improving Reliability for MBS for RRC_CONNECTED UEs", 3GPP TSG RAN WG1 #107bis-e, R1-2200719, 3rd Generation Partnership Project, Mobile Competence Centre, 650, Route Des Lucioles, F-06921 Sophia-Antipolis Cedex, France, vol. RAN WGI, No. e-Meeting, Jan. 17, 2022-Jan. 25, 2022, Jan. 26, 2022, 84 Pages, XP052103679, pp. 12, 13, 47, 49, 51, 81, 82; paragraph [2.3.1].

Lenovo et al., "On Reliability Improvement for RRC_CONNECTED UEs", R1-2200472, 3GPP TSG RAN WG1 #107bis-e e-Meeting, Jan. 17-25, 2022, 10 Pages.

Qualcomm Inc: "Maintenance on UE Feedback for Multicast RRC_CONNECTED UEs", R1-2200309, 3GPP TSG RAN WG1 #107bis-e e-Meeting, Jan. 17-25, 2022, pp. 1-4.

* cited by examiner

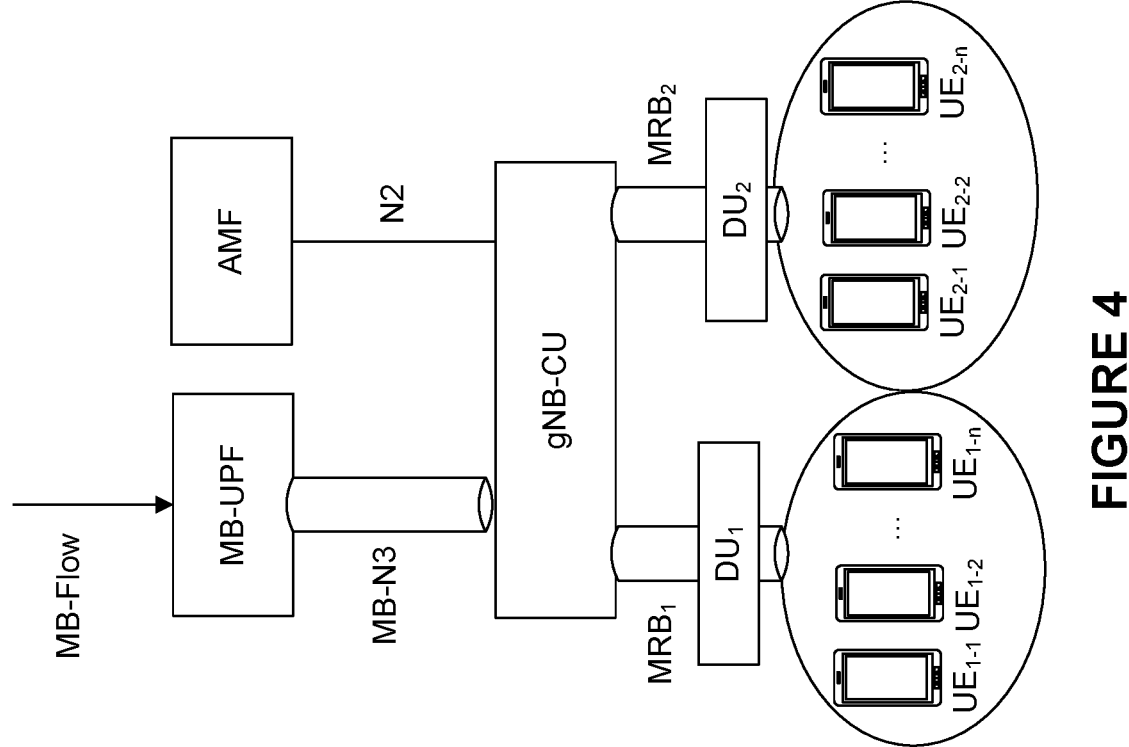
400
FIGURE 4

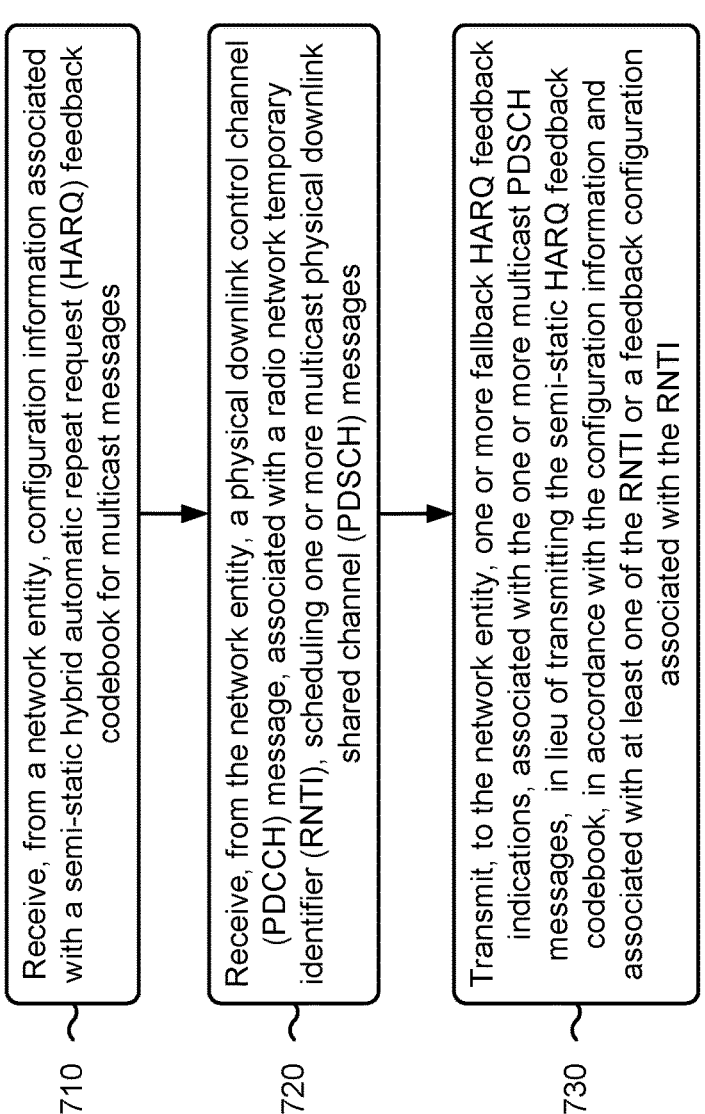

710 Receive, from a network entity, configuration information associated with a semi-static hybrid automatic repeat request (HARQ) feedback codebook for multicast messages 720 Receive, from the network entity, a physical downlink control channel (PDCCH) message, associated with a radio network temporary identifier (RNTI), scheduling one or more multicast physical downlink shared channel (PDSCH) messages 730 Transmit, to the network entity, one or more fallback HARQ feedback indications, associated with the one or more multicast PDSCH messages, in lieu of transmitting the semi-static HARQ feedback codebook, in accordance with the configuration information and associated with at least one of the RNTI or a feedback configuration associated with the RNTI

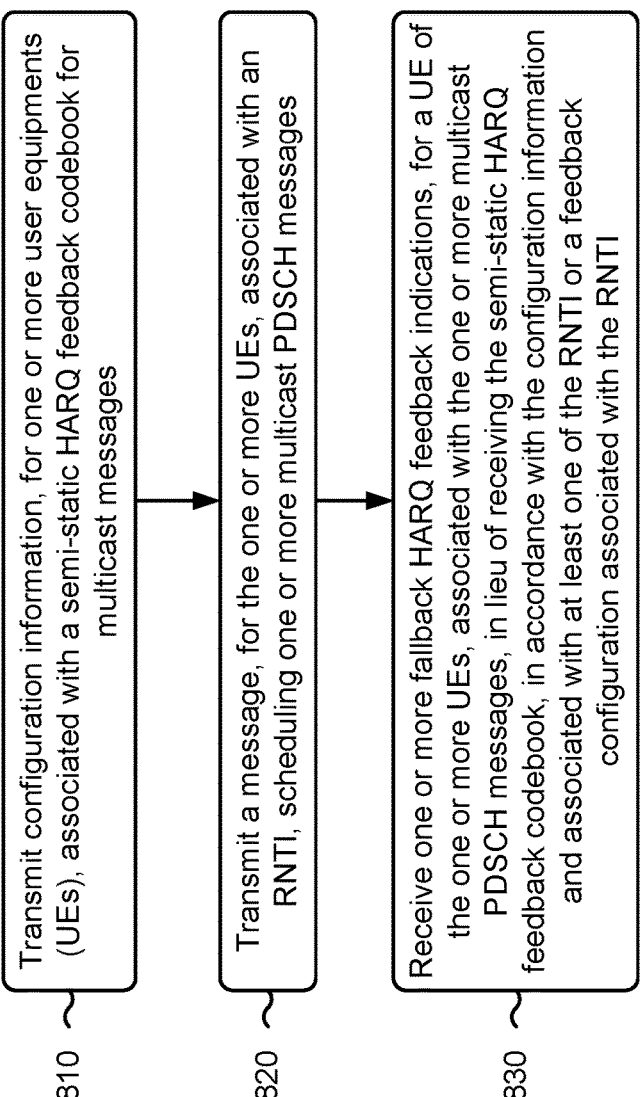

810  Transmit configuration information, for one or more user equipments (UEs), associated with a semi-static HARQ feedback codebook for multicast messages 820  Transmit a message, for the one or more UEs, associated with an RNTI, scheduling one or more multicast PDSCH messages 830  Receive one or more fallback HARQ feedback indications, for a UE of the one or more UEs, associated with the one or more multicast PDSCH messages, in lieu of receiving the semi-static HARQ feedback codebook, in accordance with the configuration information and associated with at least one of the RNTI or a feedback configuration associated with the RNTI

FALLBACK OPERATION FOR A SEMI-STATIC HYBRID AUTOMATIC REPEAT REQUEST FEEDBACK CODEBOOK FOR MULTICAST

CROSS-REFERENCE TO RELATED APPLICATION

This Patent Applications claims priority to U.S. Provisional Patent Application No. 63/267,896, filed on Feb. 11, 2022, entitled "FALLBACK OPERATION FOR A SEMI-STATIC HYBRID AUTOMATIC REPEAT REQUEST FEEDBACK CODEBOOK FOR MULTICAST," and assigned to the assignee hereof. The disclosure of the prior Applications is considered part of and is incorporated by reference into this Patent Applications.

FIELD OF THE DISCLOSURE

Aspects of the present disclosure generally relate to wireless communication and specifically, to techniques and apparatuses associated with a fallback operation for a semi-static hybrid automatic repeat request (HARQ) feedback codebook for multicast.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some examples, a multicast broadcast service architecture may be deployed in a wireless network to support multicast or broadcast services to simultaneously disseminate data, such as emergency alerts or audio or video content, among many other possibilities, to multiple user equipments (UEs) that may be located in the same or different cells. In general, because multicast broadcast operations enable multiple UEs to receive the same data at substantially the same time, multicast operations can significantly reduce network overhead relative to unicast operations in which a particular transmission is received by only one UE. In some cases, a UE may support hybrid automatic repeat request (HARQ) feedback codebook transmissions. A HARQ feedback codebook transmission may include a feedback message that the UE is to transmit to a network entity to provide feedback regarding, for example, downlink data transmission (for example, transmissions associated with a physical downlink shared channel (PDSCH)).

The UE may be configured with different types of codebooks, such as a Type-1 HARQ acknowledgement (ACK) codebook or a Type-2 HARQ ACK codebook. For example, the Type-1 HARQ ACK codebook may be associated with a fixed, or static, size (for example, that is configured by the network entity). The Type-2 HARQ ACK codebook may be associated with a dynamic size (for example, where the size of the Type-2 HARQ ACK codebook is based at least in part on, or otherwise associated with, scheduling received by the UE). Typically, if the UE is configured to transmit a Type-1 HARQ ACK codebook, the UE may collect feedback for PDSCH communications that are received by the UE during a feedback window (for example, k slots), and may transmit the Type-1 HARQ ACK codebook indicating feedback (for example, ACK/NACK feedback) associated with the PDSCH communications that are received by the UE during the feedback window. In some cases, if a small quantity of PDSCH communications are received during the feedback window, transmitting the Type-1 HARQ ACK codebook may consume significant resources (for example, time resources or frequency resources) because the Type-1 HARQ ACK codebook has a fixed sized regardless of the quantity of PDSCH communications that are received by the UE during the feedback window.

Therefore, in some cases, a fallback operation associated with Type-1 HARQ ACK codebooks may be supported by the UE. For example, in some cases, the UE may be enabled to transmit a fallback HARQ feedback indication (for example, that includes a single ACK/NACK indication or bit) that is associated with a smaller size than the Type-1 HARQ ACK codebook. In some cases, the fallback operation for Type-1 HARQ ACK codebook transmissions may be used for multicast or broadcast PDSCH receptions (for example, if the UE is configured to transmit HARQ ACK feedback). However, multicast or broadcast PDSCH receptions introduce additional problems and considerations that are not present for unicast PDSCH receptions, such as determining when to trigger or perform the fallback operation for Type-1 HARQ ACK codebook transmissions. For example, for multicast PDSCH receptions, multiple radio network temporary identifiers (RNTIs) may be configured, by one or more network entities, for the UE. Therefore, in a single feedback window for a Type-1 HARQ ACK codebook transmission, the UE may receive communications associated with different RNTIs. As another example, feedback configurations for different RNTIs may be different. For example, a given RNTI configured for the UE may be associated with dynamic enabling or disabling of feedback for communications associated with the given RNTI. Therefore, in some cases, a first RNTI may have feedback enabled for communications associated with the first RNTI and a second RNTI may have feedback disabled for communications associated with the second RNTI. As another example, some RNTIs may be associated with different feedback types than other RNTIs. For example, a first RNTI may be associated with negative ACK (NACK) only feedback (for example, where only NACK indications, and not ACK indications, are transmitted by the UE to the network entity) and a second RNTI may be associated with ACK/NACK feedback (for example, where both ACK indications and NACK indications are transmitted by the UE to the network entity). Therefore, handling of the fallback operation for Type-1 HARQ ACK codebook transmissions in multicast or broadcast scenarios may be associated with additional considerations that are not currently addressed or defined by wireless communication standards. As a result, different UEs may handle the fallback operation for Type-1 HARQ ACK codebook transmissions in multicast or broadcast scenarios differently, which may result in the network entity incorrectly interpreting feedback received from the different UEs.

SUMMARY

Some aspects described herein relate to a user equipment (UE) for wireless communication. The UE may include at least one memory and at least one processor communicatively coupled with the at least one memory. The at least one processor may be configured to cause the UE to receive, from a network entity, configuration information associated with a semi-static hybrid automatic repeat request (HARQ) feedback codebook for multicast messages. The at least one processor may be configured to cause the UE to receive, from the network entity, a physical downlink control channel (PDCCH) message, associated with a radio network temporary identifier (RNTI), scheduling one or more multicast physical downlink shared channel (PDSCH) messages. The at least one processor may be configured to cause the UE to transmit, to the network entity, one or more fallback HARQ feedback indications, associated with the one or more multicast PDSCH messages, in lieu of transmitting the semi-static HARQ feedback codebook, in accordance with the configuration information and associated with at least one of the RNTI or a feedback configuration associated with the RNTI.

Some aspects described herein relate to a network entity for wireless communication. The network entity may include at least one memory and at least one processor communicatively coupled with the at least one memory. The at least one processor may be configured to cause the network entity to transmit configuration information, for one or more UEs, associated with a semi-static HARQ feedback codebook for multicast messages. The at least one processor may be configured to cause the network entity to transmit a message, for the one or more UEs, associated with an RNTI, scheduling one or more multicast PDSCH messages. The at least one processor may be configured to cause the network entity to receive one or more fallback HARQ feedback indications, for a UE of the one or more UEs, associated with the one or more multicast PDSCH messages, in lieu of receiving the semi-static HARQ feedback codebook, in accordance with the configuration information and associated with at least one of the RNTI or a feedback configuration associated with the RNTI.

Some aspects described herein relate to a method of wireless communication performed by a UE. The method may include receiving, from a network entity, configuration information associated with a semi-static HARQ feedback codebook for multicast messages. The method may include receiving, from the network entity, a PDCCH message, associated with an RNTI, scheduling one or more multicast PDSCH messages. The method may include transmitting, to the network entity, one or more fallback HARQ feedback indications, associated with the one or more multicast PDSCH messages, in lieu of transmitting the semi-static HARQ feedback codebook, in accordance with the configuration information and associated with at least one of the RNTI or a feedback configuration associated with the RNTI.

Some aspects described herein relate to a method of wireless communication performed by a network entity. The method may include transmitting configuration information, for one or more UEs, associated with a semi-static HARQ feedback codebook for multicast messages. The method may include transmitting a message, for the one or more UEs, associated with an RNTI, scheduling one or more multicast PDSCH messages. The method may include receiving one or more fallback HARQ feedback indications, for a UE of the one or more UEs, associated with the one or more multicast PDSCH messages, in lieu of receiving the semi-static HARQ feedback codebook, in accordance with the configuration information and associated with at least one of the RNTI or a feedback configuration associated with the RNTI.

Some aspects described herein relate to a non-transitory computer-readable medium that stores a set of instructions for wireless communication by a UE. The set of instructions, when executed by one or more processors of the UE, may cause the UE to receive, from a network entity, configuration information associated with a semi-static HARQ feedback codebook for multicast messages. The set of instructions, when executed by one or more processors of the UE, may cause the UE to receive, from the network entity, a PDCCH message, associated with an RNTI, scheduling one or more multicast PDSCH messages. The set of instructions, when executed by one or more processors of the UE, may cause the UE to transmit, to the network entity, one or more fallback HARQ feedback indications, associated with the one or more multicast PDSCH messages, in lieu of transmitting the semi-static HARQ feedback codebook, in accordance with the configuration information and associated with at least one of the RNTI or a feedback configuration associated with the RNTI.

Some aspects described herein relate to a non-transitory computer-readable medium that stores a set of instructions for wireless communication by a network entity. The set of instructions, when executed by one or more processors of the network entity, may cause the network entity to transmit configuration information, for one or more UEs, associated with a semi-static HARQ feedback codebook for multicast messages. The set of instructions, when executed by one or more processors of the network entity, may cause the network entity to transmit a message, for the one or more UEs, associated with an RNTI, scheduling one or more multicast PDSCH messages. The set of instructions, when executed by one or more processors of the network entity, may cause the network entity to receive one or more fallback HARQ feedback indications, for a UE of the one or more UEs, associated with the one or more multicast PDSCH messages, in lieu of receiving the semi-static HARQ feedback codebook in accordance with the configuration information and associated with at least one of the RNTI or a feedback configuration associated with the RNTI.

Some aspects described herein relate to an apparatus for wireless communication. The apparatus may include means for receiving, from a network entity, configuration information associated with a semi-static HARQ feedback codebook for multicast messages. The apparatus may include means for receiving, from the network entity, a PDCCH message, associated with an RNTI, scheduling one or more multicast PDSCH messages. The apparatus may include means for transmitting, to the network entity, one or more fallback HARQ feedback indications, associated with the one or more multicast PDSCH messages, in lieu of transmitting the semi-static HARQ feedback codebook, in accordance with the configuration information and associated with at least one of the RNTI or a feedback configuration associated with the RNTI.

Some aspects described herein relate to an apparatus for wireless communication. The apparatus may include means for transmitting configuration information, for one or more UEs, associated with a semi-static HARQ feedback codebook for multicast messages. The apparatus may include means for transmitting a message, for the one or more UEs, associated with an RNTI, scheduling one or more multicast PDSCH messages. The apparatus may include means for receiving one or more fallback HARQ feedback indications, for a UE of the one or more UEs, associated with the one or more multicast PDSCH messages, in lieu of receiving the semi-static HARQ feedback codebook, in accordance with the configuration information and associated with at least one of the RNTI or a feedback configuration associated with the RNTI.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 4 is a diagram illustrating an example of a multicast broadcast service (MBS) architecture in accordance with the present disclosure.

FIG. 7 is a flowchart illustrating an example process performed, for example, by a UE, associated with a fallback operation for a semi-static HARQ feedback codebook for multicast in accordance with the present disclosure.

FIG. 8 is a flowchart illustrating an example process performed, for example, by a network entity, associated with a fallback operation for a semi-static HARQ feedback codebook for multicast in accordance with the present disclosure.

DETAILED DESCRIPTION

Figure 1:
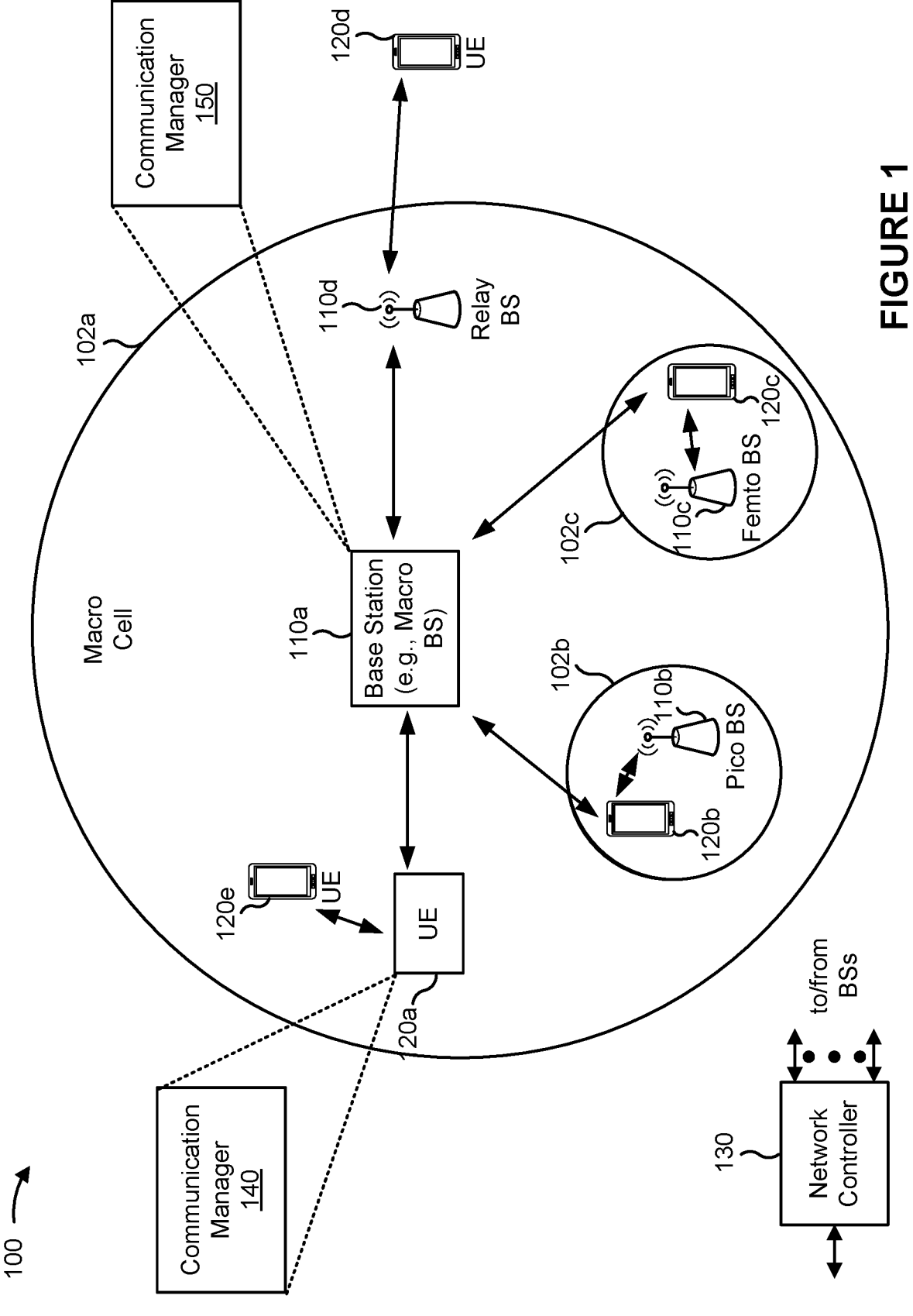
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to a fallback operation for a semi-static hybrid automatic repeat request (HARQ) feedback codebook (for example, a Type-1 HARQ acknowledgement (ACK) codebook) for multicast communications. Some aspects more specifically relate to a user equipment (UE) transmitting a fallback HARQ feedback indication for one or more multicast communications (for example, a single ACK or negative ACK (NACK) feedback indication) associated with a semi-static HARQ feedback codebook (for example, a Type-1 HARQ ACK codebook) based at least in part on, or otherwise associated with, a radio network temporary identifier (RNTI) associated with the one or more multicast communications or a feedback configuration associated with the RNTI.

In some aspects, the transmission by the UE of the fallback HARQ feedback indication for the one or more multicast communications may be based at least in part on, or otherwise associated with, the UE receiving only a single physical downlink shared channel (PDSCH) multicast communication (for example, a dynamic grant PDSCH communication or a semi-persistent scheduling (SPS) PDSCH communication) or a single multicast SPS PDSCH release communication (for example, a physical downlink control channel (PDCCH) communication that does not schedule any PDSCH communications) associated with any RNTI (for example, any group common RNTI (G-RNTI) or any group common configured scheduling RNTI (G-CS-RNTI)) during a feedback window associated with the Type-1 HARQ ACK codebook. In other words, if the UE receives multicast communications associated with different RNTIs during the feedback window, then the UE may transmit the semi-static HARQ feedback codebook (for example, a Type-1 HARQ ACK codebook), rather than transmitting the fallback HARQ feedback indication. In some other aspects, the UE may transmit a fallback HARQ feedback indication for each RNTI. For example, the transmission by the UE of the fallback HARQ feedback indication for the one or more multicast communications may be based at least in part on, or otherwise associated with, the UE receiving only a single PDSCH multicast communication (for example, a dynamic grant PDSCH communication or an SPS PDSCH communication) or a single multicast SPS PDSCH release communication (for example, a PDCCH communication that does not schedule any PDSCH communications) associated with an RNTI (for example, a G-RNTI or a G-CS-RNTI) during a feedback window associated with the Type-1 HARQ ACK codebook. For example, the UE may transmit a first fallback HARQ feedback indication associated with a first RNTI and a second fallback HARQ feedback indication associated with a second RNTI.

Additionally or alternatively, the transmission by the UE of the fallback HARQ feedback indication for the one or more multicast communications may be based at least in part on, or otherwise associated with, the feedback configuration associated with the RNTI indicating that feedback is enabled for the RNTI. In some examples, if the feedback configuration associated with the RNTI indicates that feedback is disabled for the RNTI, then the UE may not transmit the fallback HARQ feedback indication. Alternatively, in some other examples, if the feedback configuration associated with the RNTI indicates that feedback is disabled for the RNTI, then the UE may transmit a NACK indication regardless of whether the one or more multicast communications were successfully received.

Additionally or alternatively, the transmission by the UE of the fallback HARQ feedback indication for the one or more multicast communications may be based at least in part on, or otherwise associated with, the feedback configuration associated with the RNTI indicating that the RNTI is associated with ACK/NACK-based feedback (rather than NACK-only-based feedback). In some examples, if the feedback configuration associated with the RNTI indicates that the RNTI is associated with NACK-only based feedback, then the UE may not transmit the fallback HARQ feedback indication. Alternatively, in some other examples, if the feedback configuration associated with the RNTI indicates that feedback is associated with NACK-only based feedback, then the UE may transform the NACK-only feedback to ACK/NACK-based feedback (for example, may transmit the fallback HARQ feedback indication indicating ACK feedback or NACK feedback based at least in part on, or otherwise associated with, whether the one or more multicast communications were successfully received by the UE).

Particular aspects of the subject matter described in this disclosure can be implemented to realize one or more of the following potential advantages. In some examples, the described techniques can be used to synchronize a fallback operation associated with semi-static HARQ feedback codebooks (for example, Type-1 HARQ ACK codebooks) in multicast scenarios. For example, the described techniques can be used to clarify when a UE is to transmit a fallback HARQ feedback indication associated with a Type-1 HARQ ACK codebook considering additional factors present in multicast scenarios, such as the UE being configured with multiple RNTIs, feedback being enabled or disabled for certain RNTIs of the configured RNTIs, or feedback reporting being different for certain RNTIs of the configured RNTIs, among other examples. As a result, multiple UEs may handle the fallback operation for Type-1 HARQ ACK codebook transmissions in multicast scenarios in the same manner, which may enable a network entity to correctly interpret feedback received from the UEs.

FIG. 1 is a diagram illustrating an example of a wireless network in accordance with the present disclosure. The wireless network 100 may be or may include elements of a 5 G (for example, NR) network or a 4 G (for example, Long Term Evolution (LTE)) network, among other examples. The wireless network 100 may include one or more base stations 110 (shown as a base station (BS) 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some aspects, the terms "base station" (for example, the base station 110) or "network entity" may refer to an aggregated base station, a disaggregated base station, an integrated access and backhaul (IAB) node, a relay node, or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station" or "network entity" may refer to one device configured to perform one or more functions, such as those described herein in connection with the base station 110. In some aspects, the terms "base station" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network entity" may refer to any one or more of those different devices. In some aspects, the terms "base station" or "network entity" may refer to one or more virtual base stations or one or more virtual base station functions. For example, in some aspects, two or more base station functions may be instantiated on a single device. In some aspects, the terms "base station" or "network entity" may refer to one of the base station functions and not another. In this way, a single device may include more than one base station.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicleto-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network entity, configuration information associated with a semi-static HARQ feedback codebook for multicast messages; receive, from the network entity, a PDCCH message, associated with an RNTI, scheduling one or more multicast PDSCH messages; and transmit, to the network entity, one or more fallback HARQ feedback indications, associated with the one or more multicast PDSCH messages, in lieu of transmitting the semi-static HARQ feedback codebook, in accordance with the configuration information and based at least in part on, or otherwise associated with, at least one of the RNTI or a feedback configuration associated with the RNTI. Additionally or alternatively, the communication manager 140 may perform one or more other operations described herein.

In some aspects, a network entity (e.g., the base station 110) may include a communication manager 150. As described in more detail elsewhere herein, the communication manager 150 may transmit, to one or more UEs, configuration information associated with a semi-static HARQ feedback codebook for multicast messages; transmit, to the one or more UEs, a PDCCH message, associated with an RNTI, scheduling one or more multicast PDSCH messages; and receive, from a UE of the one or more UEs, one or more fallback HARQ feedback indications, associated with the one or more multicast PDSCH messages, in lieu of receiving the semi-static HARQ feedback codebook, in accordance with the configuration information and based at least in part on, or otherwise associated with, at least one of the RNTI or a feedback configuration associated with the RNTI. Additionally or alternatively, the communication manager 150 may perform one or more other operations described herein.

Figure 2:
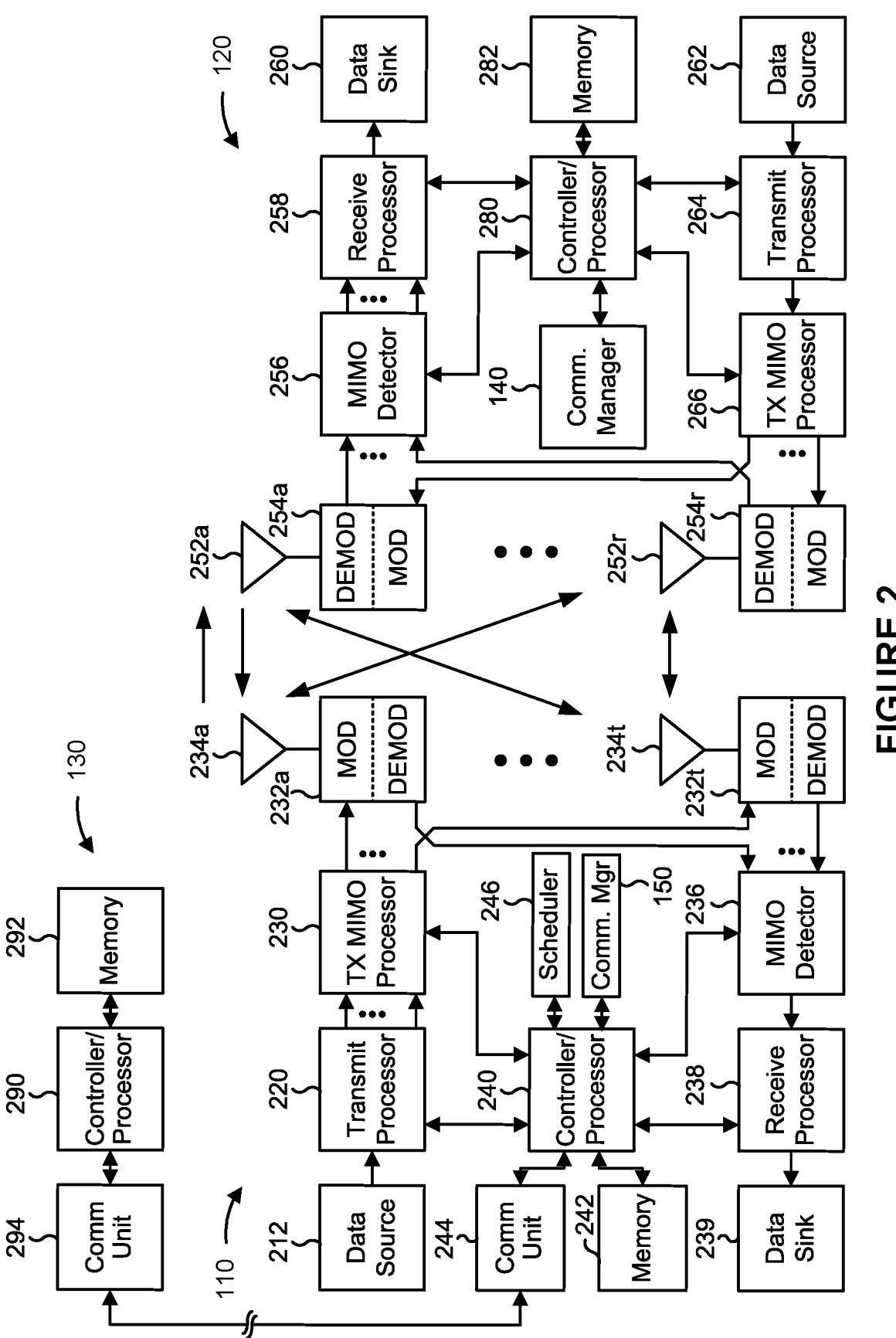
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on, or otherwise associated with, one or more channel quality indicators (CQIs) received from that UE 120. The base station 110 may process (for example, encode and modulate) the data for the UE 120 based at least in part on, or otherwise associated with, the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with a fallback operation for a semi-static HARQ feedback codebook for multicast, as described in more detail elsewhere herein. For example, the controller/processor 240 of the base station 110, the controller/processor 280 of the UE 120, or any other component(s) of FIG. 2 may perform or direct operations of, for example, process 700 of FIG. 7, process 800 of FIG. 8, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 700 of FIG. 7, process 800 of FIG. 8, or other processes as described herein. In some examples, executing instructions may include running the instructions, converting the instructions, compiling the instructions, or interpreting the instructions, among other examples.

In some aspects, the UE 120 includes means for receiving, from a network entity, configuration information associated with a semi-static HARQ feedback codebook for multicast messages; means for receiving, from the network entity, a PDCCH message, associated with an RNTI, scheduling one or more multicast PDSCH messages; or means for transmitting, to the network entity, one or more fallback HARQ feedback indications, associated with the one or more multicast PDSCH messages, in lieu of transmitting the semi-static HARQ feedback codebook, in accordance with the configuration information and based at least in part on, or otherwise associated with, at least one of the RNTI or a feedback configuration associated with the RNTI. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity includes means for transmitting configuration information associated with a semi-static HARQ feedback codebook for multicast messages; means for transmitting a PDCCH message, associated with an RNTI, scheduling one or more multicast PDSCH messages; or means for receiving one or more fallback HARQ feedback indications, associated with the one or more multicast PDSCH messages, in lieu of receiving the semi-static HARQ feedback codebook, in accordance with the configuration information and based at least in part on, or otherwise associated with, at least one of the RNTI or a feedback configuration associated with the RNTI. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station.

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as a CU, one or more DUs, or one or more RUs). In some examples, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
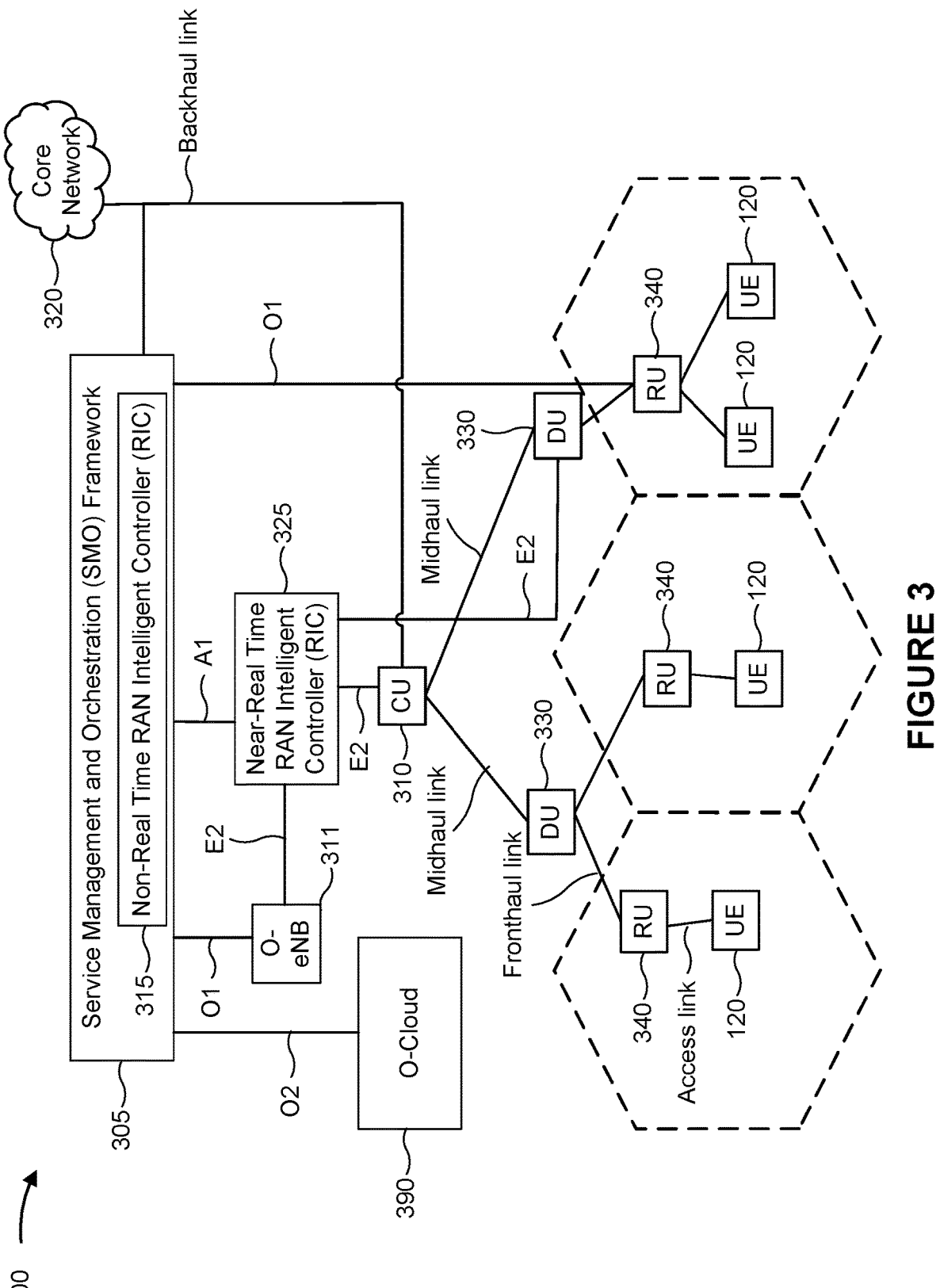
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which may also be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts radio frequency (RF) processing functions or low-PHY layer functions, such as performing an FFT, performing an iFFT, digital beamforming, or PRACH extraction and filtering, among other examples, based at least in part on, or otherwise associated with, a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

In some cases, a multicast communication may be a communication of information to a plurality (for example, a set) of UEs 120. In some cases, each of the UEs 120 may need to join a multicast session prior to receiving information using the multicast communication. For example, the UEs 120 may join the multicast session using non-access stratum (NAS) based signaling. In some cases, the UEs 120 may need to be authorized, or authenticated, prior to joining the multicast session. For example, the base station may indicate to a UE 120, of the set of UEs 120, whether the UE 120 is authorized or authenticated prior to the UE 120 joining the multicast session and receiving information via a multicast communication. In some cases, not all of the UEs 120 within an area (for example, a multicast service area) may receive the information via the multicast communication. For example, the base station may transmit the information to a subset of the UEs 120, of the set of UEs 120, within the multicast service area. In some cases, a UE 120 in the multicast service area that has not been authorized or authenticated may not receive the information via the multicast communication. In some cases, the base station is aware of whether or not individual UEs 120, of the set of UEs 120, have received the information using the multicast communication. In some cases, the multicast communication may be referred to as a "one-to-many" communication.

In some cases, a broadcast communication may be a communication of information to all UEs 120 within an area (for example, a broadcast service area). The UEs 120 may not need to join a session prior to receiving the information using the broadcast communication. For example, the UEs 120 may not need to access a session using NAS based signaling prior to receiving the information using the broadcast communication. In some cases, the UEs 120 may not need to be authorized, or authenticated, prior to receiving information via a broadcast communication. In some cases, the base station may transmit the information to all of the UEs 120 within the broadcast service area. For example, the base station may not be able to broadcast the information to only a subset of the UEs 120. In some cases, the base station may not be aware of whether or not individual UEs 120, of the set of UEs 120, have received the information using the broadcast communication. In some cases, the broadcast communication may be referred to as a "one-to-all" communication.

FIG. 4 is a diagram illustrating an example of an MBS architecture 400 in accordance with the present disclosure. In some examples, the multicast broadcast service architecture may be deployed in a wireless network (for example, wireless network 100) to support multicast or broadcast services to simultaneously disseminate data, such as emergency alerts or audio or video content, among many other possibilities, to multiple UEs that may be located in the same or different cells. In general, because multicast broadcast operations enable multiple UEs to receive the same data at substantially the same time, multicast operations can significantly reduce network overhead relative to unicast operations in which a particular transmission is received by only one UE.

In a wireless network, MBS operations may be supported using enhanced multimedia broadcast/multicast service (eMBMS), single-cell point-to-multipoint (SC-PTM) services, multimedia broadcast multicast service over single frequency network (MBSFN), or enhanced TV (EnTV), among other examples. For example, in eMBMS, multicast data is transmitted in multiple cells to a group of UEs located in a particular area. In SC-PTM, multicast data is transmitted in a particular cell and the multicast data is received by a group of UEs that are located in the particular cell. In an NR network, a UE may receive multicast broadcast services in mixed mode or broadcast mode. For example, in mixed mode, a UE in an RRC connected mode may receive multicast broadcast service using a multicast broadcast radio bearer (MRB) or a dedicated radio bearer (DRB). In broadcast mode, a UE may receive multicast broadcast service using an MRB in an RRC connected mode, an RRC idle mode, or an RRC inactive mode.

As shown in FIG. 4, the MBS architecture 400 may include a multicast broadcast user plane function (MB-UPF) that receives (for example, from an application server) a multicast broadcast (MB) flow including content to be multicasted or broadcasted. As further shown, the multicast broadcast service architecture may include a centralized base station unit (gNB-CU), such as a CU, that receives the MB flow and a temporary mobile group identity (TMGI) associated with the MB flow from the MB-UPF over an MB-N3 tunnel (for example, a user plane interface for delivering the MB flow and the corresponding TMGI using a general packet radio service tunneling protocol (GTP)). Furthermore, the gNB-CU may communicate with an AMF that manages UE network registration, manages mobility, maintains non-access stratum (NAS) signaling connections, or manages UE registration procedures, among other examples. For example, the gNB-CU may communicate with the AMF over an N2 interface that enables control signaling to establish or modify the MB flow or the TMGI.

In some examples, the gNB-CU may map the MB flow received from the MB-UPF to an MRB or a DRB based at least in part on, or otherwise associated with, the TMGI associated with the MB flow, and the gNB-CU may forward the MB flow to a DU that may include one or more TRPs, which may multicast or broadcast the content included in the MB flow to one or more UEs via an MRB. Additionally or alternatively, the DU may transmit the content included in the MB flow to one or more UEs via a DRB. In this way, the multicast broadcast service architecture may flexibly switch between transmitting content to UEs via a DRB (or a unicast bearer) and an MRB, and may provide unicast assistance to the MRB at lower layers to improve reliability or reduce service disruption.

Figure 5:
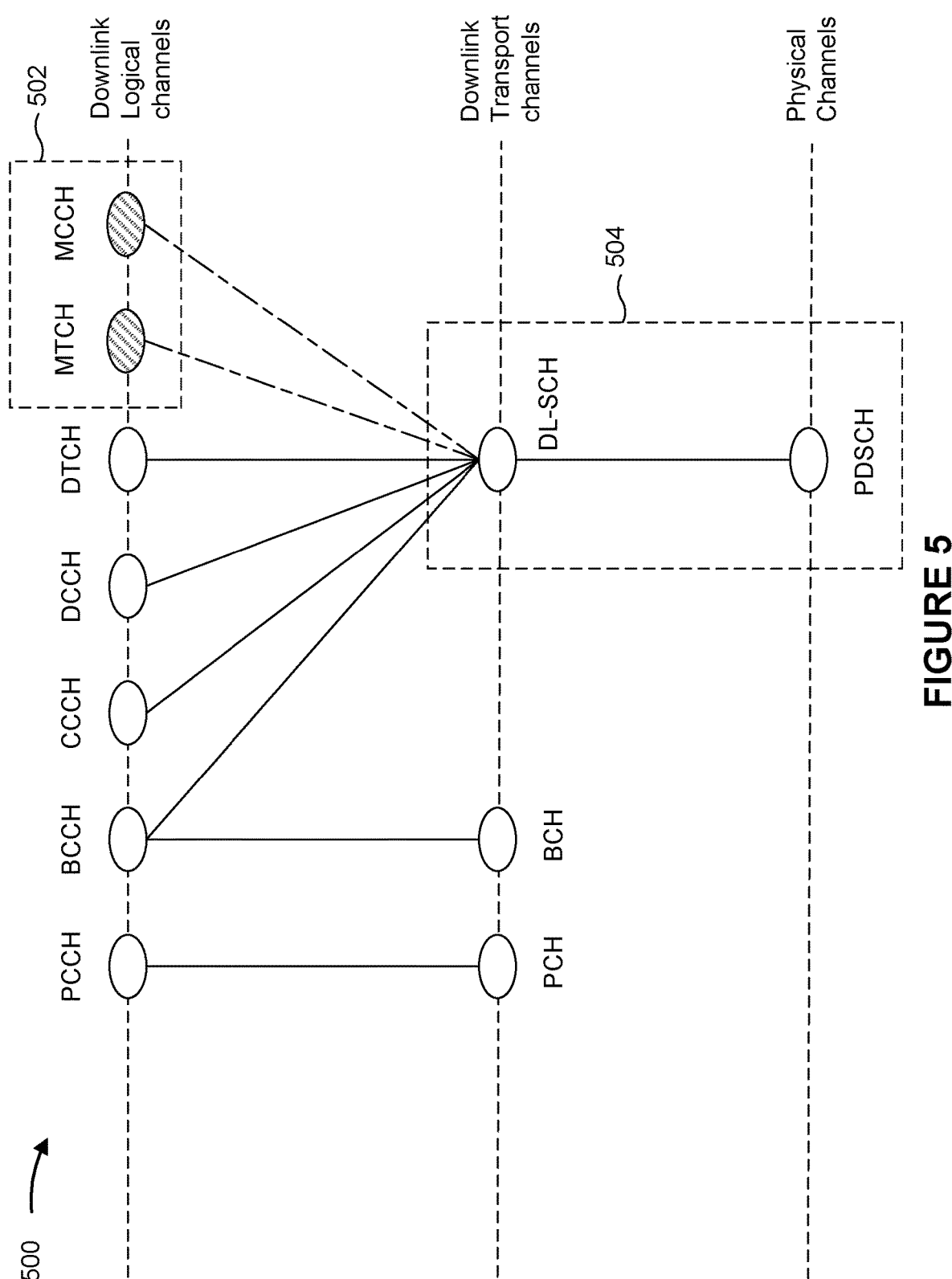
FIG. 5 is a diagram illustrating an example of a channel mapping for MBS communications in accordance with the present disclosure.

FIG. 5 is a diagram illustrating an example of a channel mapping 500 for MBS communications in accordance with the present disclosure. As shown by MBS channels 502, multicast or broadcast transmissions in an NR network may be supported using a multicast broadcast traffic channel (MTCH) and a multicast broadcast control channel (MCCH). The MTCH may carry multicast or broadcast data, while the MCCH may carry configuration information or control information for multicast or broadcast communications to be transmitted on the MTCH. An MBS communication on the MTCH may be addressed to a group of UEs using a group common radio network temporary identifier (G-RNTI).

In some examples, different MTCHs may be used to carry multicast broadcast traffic with different quality of service (QoS) requirements. A multicast broadcast traffic flow with associated QoS requirements or QoS parameters (for example, a group of related packets for the same multicast broadcast service) may be referred to as an MB-QoS flow. In some examples, there may be a one-to-one mapping between MB-QoS flows and MTCHs. A base station or a core network device may configure a multicast broadcast radio bearer (MRB) for an MB-QoS flow. In some examples, there may be a one-to-one mapping between MB-QoS flows and MRBs. Accordingly, each MTCH may correspond to an MRB for carrying an MB-QoS flow.

The MCCH may carry configuration information for configuring the MTCHs, and may be addressed to all UEs in a cell (for example, a physical cell or a virtual cell) using a single cell RNTI (SC-RNTI). In some examples, there may be a single MCCH per cell (physical cell or virtual cell), and the MCCH may carry MTCH configuration information for multiple multicast broadcast services with different MB-QoS flows. As shown by channel mapping 504, the MCCH and the MTCH are logical channels, and may be mapped to a downlink shared channel (DL-SCH) transport channel, which may be mapped to a physical downlink shared channel (PDSCH).

In some cases, a UE may support HARQ feedback codebook transmissions (for example, at least for multicast services with a quality of service (QoS) requirement). A HARQ feedback codebook transmission may include a feedback message that the UE is to transmit to a network entity to provide feedback regarding, for example, downlink data transmission (for example, transmissions associated with a physical downlink shared channel (PDSCH)). For example, the UE may be configured to transmit HARQ codebook transmissions (for example, corresponding to one or more HARQ process identifiers).

The UE may be configured with different types of codebooks, such as a Type-1 HARQ acknowledgement (ACK) codebook or a Type-2 HARQ ACK codebook. The Type-1 HARQ ACK codebook may be referred to herein as a "semi-static HARQ feedback codebook." The Type-2 HARQ ACK codebook may be referred to as a "dynamic HARQ feedback codebook." For example, the Type-1 HARQ ACK codebook may be associated with a fixed, or static, size (for example, that is configured by the network entity). The Type-2 HARQ ACK codebook may be associated with a dynamic size (for example, where the size of the Type-2 HARQ ACK codebook is based at least in part on, or otherwise associated with, scheduling received by the UE). Additional details regarding some HARQ ACK codebooks can be found in, for example, 3GPP Technical Specification (TS) 38.213, Release (Rel.) 17, Version 17.0.0, such as in Section 9.1. Another type of HARQ ACK codebook that the UE may support is an enhanced Type-3 HARQ ACK Codebook, which may have a smaller size relative to other HARQ ACK codebooks defined for Rel. 16.

A codebook may be a sequence of bits, which may be constructed using ACK/NACK feedback associated with multiple PDSCH communications that are received by a UE during a feedback window. For Type-1 HARQ ACK codebooks, typically, if the UE is configured to transmit a Type-1 HARQ ACK codebook, the UE may collect feedback for PDSCH communications that are received by the UE during a feedback window (for example, k slots), and may transmit the Type-1 HARQ ACK codebook indicated feedback (for example, ACK/NACK feedback) associated with the PDSCH communications that are received by a UE during the feedback window. As described above, the Type-1 HARQ ACK codebook may have a static or fixed size. Therefore, in some cases, if a small quantity of PDSCH communications are received during the feedback window, transmitting the Type-1 HARQ ACK codebook may consume significant resources (for example, time resources or frequency resources) because the Type-1 HARQ ACK codebook has a fixed sized regardless of the quantity of PDSCH communications that are received by the UE during the feedback window.

Therefore, in some cases, a fallback operation associated with Type-1 HARQ ACK codebooks may be supported by the UE. For example, in some cases, the UE may be enabled to transmit a fallback HARQ feedback indication (for example, that includes a single ACK/NACK indication or bit) that is associated with a smaller size than the Type-1 HARQ ACK codebook. For example, if the UE is to report HARQ-ACK information via a physical uplink control channel (PUCCH), and the UE is configured to transmit Type-1 HARQ ACK codebooks, the UE may transmit a fallback HARQ feedback indication if, during a feedback window, the UE receives a single PDCCH communication scheduling one or more PDSCH communications. In some examples, the UE may transmit a fallback HARQ feedback indication if, during a feedback window, the UE receives a semi-persistent scheduling (SPS) PDSCH release (for example, a PDCCH communication with no scheduled PDSCH data) indicated by a downlink control information (DCI) format 1_0 (for example, with a counter downlink assignment index (DAI) field value of 1, thereby indicating that there is only 1 transmission of the PDCCH communication)), a PDSCH communication scheduled by a DCI format 1_0 with a counter DAI field value of 1 (for example, on a primary cell (PCell) associated with the UE), or one or more SPS PDSCH communications (for example, associated with a single PDCCH communication or no PDCCH communications). The network entity may perform a blind decoding to determine if the Type-1 HARQ ACK codebook or the fallback HARQ feedback indication is transmitted by the UE. The fallback operation may be defined, or otherwise fixed, for unicast communications by 3GPP TS 38.213, Rel. 17, Version 17.0.0, such as in Section 9.1.2.

In some cases, the fallback operation for Type-1 HARQ ACK codebook transmissions may be used for multicast or broadcast PDSCH receptions (for example, if the UE is configured to transmit HARQ-ACK feedback). However, multicast or broadcast PDSCH receptions introduce additional problems and considerations that are not present for unicast PDSCH receptions for determining, by a UE, when to trigger or perform the fallback operation for Type-1 HARQ ACK codebook transmissions. For example, for multicast or broadcast PDSCH receptions, multiple RNTIs (for example, multiple G-RNTIs or multiple group common configured scheduling (G-CS-RNTIs) may be configured, by one or more network entities, for the UE. Therefore, in a single feedback window for a Type-1 HARQ ACK codebook transmission, the UE may receive communications associated with different RNTIs. As another example, feedback configurations for different RNTIs may be different. For example, a given RNTI configured for the UE may be associated with dynamic enabling or disabling of feedback for communications associated with the given RNTI. Therefore, in some cases, a first RNTI may have feedback enabled for communications associated with the first RNTI and a second RNTI may have feedback disabled for communications associated with the second RNTI. As another example, some RNTIs may be associated with different feedback types than other RNTIs. For example, a first RNTI may be associated with NACK only feedback (for example, where only NACK indications, and not ACK indications, are transmitted by the UE to the network entity) and a second RNTI may be associated with ACK/NACK feedback (for example, where both ACK indications and NACK indications are transmitted by the UE to the network entity). Therefore, handling of the fallback operation for Type-1 HARQ ACK codebook transmissions in multicast scenarios may be associated with additional considerations that are not currently addressed or defined by wireless communication standards. As a result, different UEs may handle the fallback operation for Type-1 HARQ ACK codebook transmissions in multicast scenarios differently, which may result in the network entity incorrectly interpreting feedback received from the different UEs.

Various aspects relate generally to a fallback operation for a semi-static HARQ feedback codebook (for example, a Type-1 HARQ ACK codebook) for multicast communications. Some aspects more specifically relate to a UE transmitting a fallback HARQ feedback indication for one or more multicast communications (for example, a single ACK or NACK feedback indication) associated with a semi-static HARQ feedback codebook (for example, a Type-1 HARQ ACK codebook) based at least in part on, or otherwise associated with, an RNTI associated with the one or more multicast communications or a feedback configuration associated with the RNTI.

In some aspects, the transmission by the UE of the fallback HARQ feedback indication for the one or more multicast communications may be based at least in part on, or otherwise associated with, the UE receiving only a single PDSCH multicast communication (for example, a dynamic grant PDSCH communication or an SPS PDSCH communication) or a single multicast SPS PDSCH release communication (for example, a PDCCH communication that does not schedule any PDSCH communications) associated with any RNTI (for example, any G-RNTI or any G-CS-RNTI) during a feedback window associated with the Type-1 HARQ ACK codebook. In other words, if the UE receives multicast communications associated with different RNTIs during the feedback window, then the UE may transmit the semi-static HARQ feedback codebook (for example, a Type-1 HARQ ACK codebook), rather than transmitting the fallback HARQ feedback indication. In some other aspects, the UE may transmit a fallback HARQ feedback indication for each RNTI. For example, the transmission by the UE of the fallback HARQ feedback indication for the one or more multicast communications may be based at least in part on, or otherwise associated with, the UE receiving only a single PDSCH multicast communication (for example, a dynamic grant PDSCH communication or an SPS PDSCH communication) or a single multicast SPS PDSCH release communication (for example, a PDCCH communication that does not schedule any PDSCH communications) associated with an RNTI (for example, a G-RNTI or a G-CS-RNTI) during a feedback window associated with the Type-1 HARQ ACK codebook. For example, the UE may transmit a first fallback HARQ feedback indication associated with a first RNTI and a second fallback HARQ feedback indication associated with a second RNTI.

Additionally or alternatively, the transmission by the UE of the fallback HARQ feedback indication for the one or more multicast communications may be based at least in part on, or otherwise associated with, the feedback configuration associated with the RNTI indicating that feedback is enabled for the RNTI. If the feedback configuration associated with the RNTI indicates that feedback is disabled for the RNTI, then the UE may not transmit the fallback HARQ feedback indication. Alternatively, if the feedback configuration associated with the RNTI indicates that feedback is disabled for the RNTI, then the UE may transmit a NACK indication regardless of whether the one or more multicast communications were successfully received. Additionally or alternatively, the transmission by the UE of the fallback HARQ feedback indication for the one or more multicast communications may be based at least in part on, or otherwise associated with, the feedback configuration associated with the RNTI indicating that the RNTI is associated with ACK/NACK-based feedback (rather than NACK-only-based feedback). For example, if the feedback configuration associated with the RNTI indicates that the RNTI is associated with NACK-only based feedback, then the UE may not transmit the fallback HARQ feedback indication. Alternatively, if the feedback configuration associated with the RNTI indicates that feedback is associated with NACK-only based feedback, then the UE may transform the NACK-only feedback to ACK/NACK-based feedback (for example, may transmit the fallback HARQ feedback indication indicating ACK feedback or NACK feedback based at least in part on, or otherwise associated with, whether the one or more multicast communications were successfully received by the UE).

Particular aspects of the subject matter described in this disclosure can be implemented to realize one or more of the following potential advantages. In some examples, the described techniques can be used to synchronize a fallback operation associated with semi-static HARQ feedback codebooks (for example, Type-1 HARQ ACK codebooks) in multicast scenarios. For example, the described techniques can be used to clarify when a UE is to transmit a fallback HARQ feedback indication associated with a Type-1 HARQ ACK codebook considering additional factors present in multicast scenarios, such as the UE being configured with multiple RNTIs, feedback being enabled or disabled for certain RNTIs of the configured RNTIs, or feedback reporting being different for certain RNTIs of the configured RNTIs, among other examples. As a result, UEs may handle the fallback operation for Type-1 HARQ ACK codebook transmissions in multicast scenarios in the same manner, which may enable a network entity to correctly interpret feedback received from the UEs.

Figure 6:
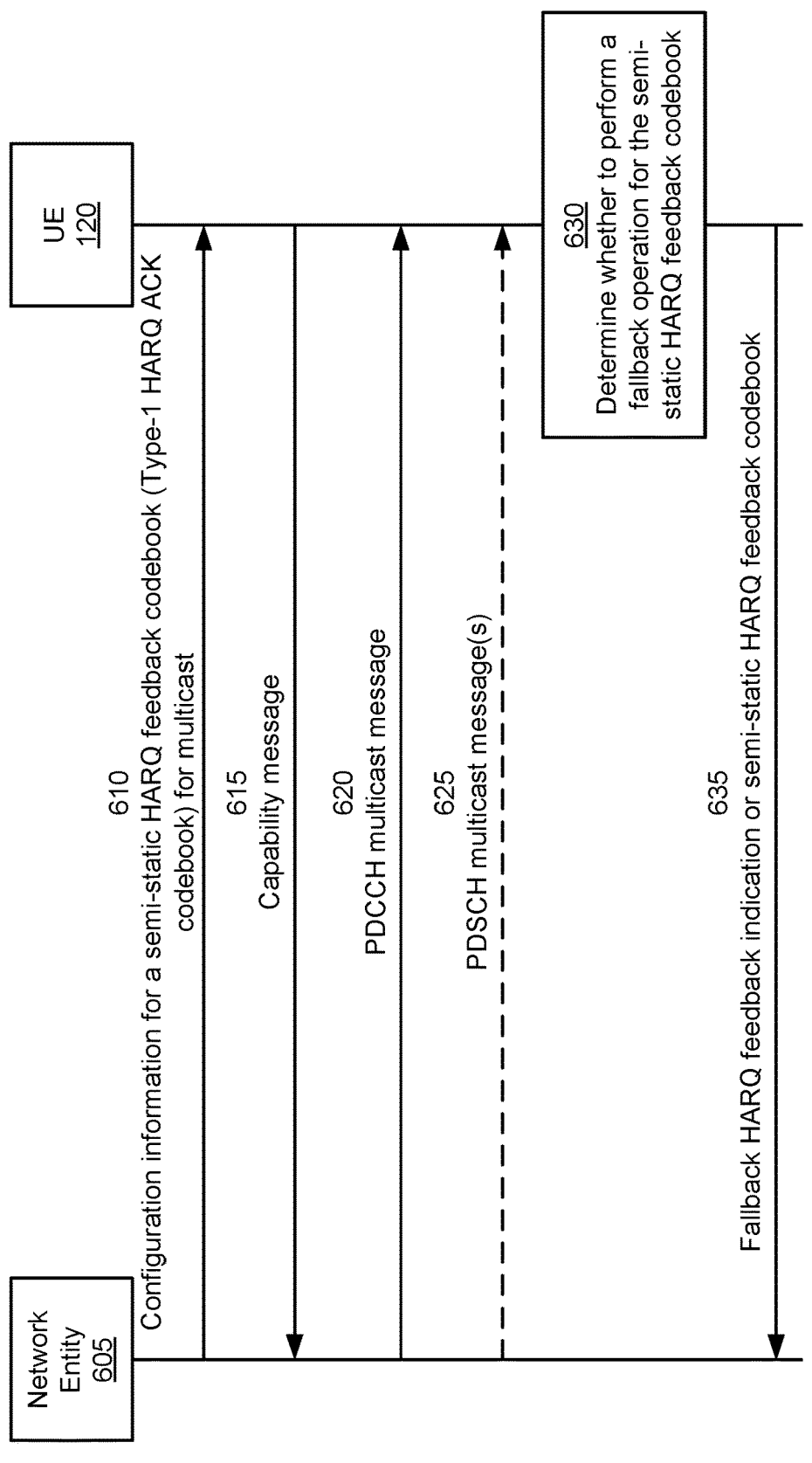
FIG. 6 is a diagram of an example associated with a fallback operation for a semi-static hybrid automatic repeat request (HARQ) feedback codebook for multicast in accordance with the present disclosure.

FIG. 6 is a diagram of an example associated with a fallback operation 600 for a semi-static hybrid automatic repeat request feedback codebook for multicast in accordance with the present disclosure. As shown in FIG. 6, a network entity 605 may communicate with a UE (for example, the UE 120). The network entity 605 may be a base station, a CU, a DU, or an RU, among other examples. In some aspects, the network entity 605 and the UE 120 may be part of a wireless network (for example, the wireless network 100). The UE 120 and the network entity 605 may have established a wireless connection prior to operations shown in FIG. 6. Although examples of the fallback operation 600 are described herein in connection with multicast communications, the fallback operation 600 may be similarly applied to broadcast communications or any other group-based messaging where a first device is transmitting a communication to multiple devices.

In a first operation 610, the network entity 605 may transmit, and the UE 120 may receive, configuration information. In some aspects, the UE 120 may receive the configuration information via one or more of RRC signaling, one or more MAC control elements (MAC-CEs), or downlink control information (DCI), among other examples. In some aspects, the configuration information may include an indication of one or more configuration parameters (for example, already known to the UE 120 or previously indicated by the network entity 605 or other network device) for selection by the UE 120, or explicit configuration information for the UE 120 to use to configure the UE 120, among other examples.

In some aspects, the configuration information may indicate information associated with a semi-static HARQ feedback codebook for multicast messages. For example, the configuration information may indicate that the UE 120 is to use a Type-1 HARQ-ACK feedback codebook for multicast messages transmitted by the network entity 605. For example, the network entity 605 may transmit an indication of a PDSCH HARQ ACK codebook field with a value of semi-static (for example, the UE may be configured with an RRC parameter pdsch-HARQ-ACK-Codebook=semi-static) for multicast messages. In some aspects, the configuration information may indicate that the UE 120 is to transmit the feedback (for example, is to transmit the semi-static HARQ feedback codebook) via the PUCCH (for example, rather than a physical uplink shared channel (PUSCH)). For example, the network entity 605 may configure the UE 120 to transmit a Type-1 HARQ-ACK feedback codebook for multicast messages in a similar, or the same, manner as defined by 3GPP TS 38.213, Rel. 17, Version 17.0.0.

In some aspects, the configuration information may indicate a configuration for one or more RNTIs. For example, the RNTIs may be G-RNTIs, or G-CS-RNTIs, among other examples. For example, to facilitate multicast or broadcast messaging, the network entity 605 may configure the UE 120 with multiple RNTIs (for example, to identify different groups of UEs associated with the multicast or broadcast messaging). As described elsewhere herein, an RNTI may be an identifier that is associated with a value or a range of values. For example, an RNTI may be a 16-bit identifier. Different RNTIs may have different values or ranges of values. A G-RNTI may be used for dynamic scheduling of multicast messages. A G-CS-RNTI may be used for SPS associated with multicast messages.

In some aspects, the configuration information may indicate whether a field associated with enabling or disabling feedback (for example, HARQ-ACK feedback) is to be present in DCI scheduling the multicast messages. For example, the network entity 605 may use RRC signaling to indicate the presence of a field for enabling or disabling HARQ-ACK feedback in group-common DCI for scheduling dynamic grant multicast messages or for activating SPS multicast messages (for example, in a DCI format 4_2, as defined or otherwise fixed by the 3GPP). As another example, the network entity 605 may use RRC signaling to indicate whether feedback (for example, HARQ-ACK feedback) is enabled or disabled for a given RNTI configured for the UE 120. For example, the configuration information may indicate whether the HARQ-ACK feedback is enabled or disabled for a given G-RNTI or a given G-CS-RNTI, among other examples.

In some aspects, the configuration information may indicate respective feedback configurations for each RNTI configured for the UE 120. For example, a feedback configuration may indicate whether feedback is enabled or disabled for the RNTI associated with the feedback configuration, or a type of feedback to be associated with the RNTI. The types of feedback may include ACK/NACK feedback (for example, where the UE 120 may transmit ACK indications or NACK indications), or NACK-only feedback (for example, where the UE 120 transmits only NACK indications and not ACK indications). For example, different RNTIs may have different feedback configurations. In other words, the network entity 605 may separately configure feedback configurations for each RNTI that is configured for the UE 120.

The UE 120 may configure itself based at least in part on, or otherwise associated with, the configuration information. In some aspects, the UE 120 may be configured to perform one or more operations described herein based at least in part on, or otherwise associated with, the configuration information.

In a second operation 615, the UE may transmit, and the network entity 605 may receive, a capability message. In some aspects, the capability message may indicate UE support for transmitting fallback HARQ feedback indications associated with the semi-static HARQ feedback codebook (for example, the Type-1 HARQ ACK codebook). For example, the UE 120 may transmit, and the network entity 605 may receive, a capability message that indicates that the UE supports fallback HARQ feedback indications associated with the semi-static HARQ feedback codebook. In some aspects, the UE supporting fallback HARQ feedback indications associated with the semi-static HARQ feedback codebook is based at least in part on, or otherwise associated with, a type of multicast messages associated with the fallback HARQ feedback indications (for example, dynamic grant versus SPS), a frequency band associated with the fallback HARQ feedback indications, or a feature set per component-carrier (FSPC) associated with the fallback HARQ feedback indications, among other examples. For example, the capability of the UE 120 to support a fallback operation for the Type-1 HARQ ACK codebook associated with multicast messages may be based at least in part on, or otherwise associated with, the type of multicast messages associated with the fallback operation, a frequency band, or a FSPC, among other examples.

For example, the capability message may indicate different capabilities of the UE 120 associated with supporting fallback HARQ feedback indications associated with the semi-static HARQ feedback codebook for dynamic grant multicast messages and SPS multicast messages (for example, the capability message may indicate separate capabilities or the UE 120 may transmit separate capability messages). Additionally or alternatively, the UE capability to support a fallback operation for the Type-1 HARQ ACK codebook associated with multicast messages may be different for different frequency bands or different FSPCs, among other examples. In some aspects, the UE 120 may transmit the capability message in the second operation 615 prior to receiving the configuration information in the first operation 610. In some aspects, the network entity 605 may determine the configuration information based at least in part on, or otherwise associated with, the UE capability indicated by the capability message.

In some aspects, in a third operation 620, the network entity 605 may transmit, and the UE 120 may receive, a PDCCH multicast communication. For example, the network entity 605 may transmit, and the UE 120 may receive, a PDCCH message, associated with an RNTI (for example, from the RNTIs configured for the UE 120 in the first operation 610), scheduling one or more multicast PDSCH messages. In some other aspects, the PDCCH message may not schedule any PDSCH messages. In some aspects, the PDCCH message may include DCI. In some aspects, the DCI may have a DCI format 4_1 (for example, as defined, or otherwise fixed, by the 3GPP). In some aspects, the PDCCH message may schedule one or more dynamic grant multicast PDSCH messages. In some other aspects, the PDCCH message may be an SPS PDSCH release (for example, a PDCCH message that does not schedule any PDSCH messages or that deactivates configured SPS PDSCH messages).

In some aspects, in a fourth operation 625, the network entity 605 may transmit, and the UE 120 may receive, one or more PDSCH multicast messages. For example, the one or more PDSCH multicast messages may be scheduled by the PDCCH message in the third operation 620. In some other aspects, the one or more PDSCH multicast messages may be SPS multicast messages (for example, that are activated by a PDCCH message, such as the PDCCH message received by the UE 120 in the third operation 620). For example, the one or more PDSCH multicast messages may be SPS multicast messages that may not be scheduled by a PDCCH message (for example, may not be scheduled by DCI). The one or more PDSCH messages may be associated with an RNTI (for example, the RNTI associated with the PDCCH message received by the UE 120 in the third operation 620). For example, if the one or more PDSCH messages are dynamic grant PDSCH messages, then the RNTI may be a G-RNTI. If the one or more PDSCH messages are SPS multicast messages, then the RNTI may be a G-CS-RNTI.

In some aspects, the semi-static HARQ feedback codebook for multicast messages (for example, the Type-1 HARQ-ACK feedback codebook) may be associated with a feedback window. The feedback window may be a duration of time during which the UE is to collect feedback (for example, ACK/NACK feedback) for messages received by the UE. After the feedback window, the UE 120 may transmit the Type-1 HARQ-ACK feedback codebook indicating the feedback for the messages received by the UE during the feedback window. In some aspects, the feedback window may be based at least in part on, or otherwise associated with, DCI received by the UE (for example, in the PDCCH message received by the UE in the third operation 620). For example, DCI may include a PDSCH-to-HARQ feedback timing indicator. The PDSCH-to-HARQ feedback timing indicator may indicate a value (for example, k). The value, k, may indicate HARQ feedback timing (in terms of a quantity of slots) to UE 120. For example, the UE 120 may receive a PDSCH message in a slot n and DCI format 1_0 may be used by the network entity 605 to schedule the PDSCH message. In such examples, the Type-1 HARQ-ACK feedback codebook may indicate feedback associated with PDSCH messages received by the UE 120 during slots n through slot n+(k−1), where the Type-1 HARQ-ACK feedback codebook is transmitted by the UE 120 in slot n+k. In some other aspects, the PDSCH-to-HARQ feedback timing indicator may indicate multiple values, such as where the DCI format 1_1 is used by the network entity 605 to schedule a PDSCH message. For example, the PDSCH-to-HARQ feedback timing indicator may indicate values of (1, 2, 3, 5, and 7). In such examples, the Type-1 HARQ-ACK feedback codebook may indicate feedback associated with PDSCH messages received by the UE 120 during slots n+1, n+2, n+3, n+5, and n+7. The PDCCH message may be received by the UE 120 in the third operation 620 in the slot n. In some aspects, the PDCCH message may include the PDSCH-to-HARQ feedback timing indicator, as described above, indicating the feedback window associated with Type-1 HARQ-ACK feedback codebook reporting.

In a fifth operation 630, the UE 120 may determine whether to perform a fallback operation for the semi-static HARQ feedback codebook (for example, for the Type-1 HARQ-ACK feedback codebook). For example, as described elsewhere herein, the fallback operation may include the UE 120 transmitting (for example, in a sixth operation 635) a fallback HARQ feedback indication rather than the semi-static HARQ feedback codebook. The fallback HARQ feedback indication may be a single HARQ ACK indication (for example, a single ACK or NACK indication). For example, in some cases (as described in more detail elsewhere herein), the UE 120 may transmit the fallback HARQ feedback indication rather than the semi-static HARQ feedback codebook to conserve resources, such as where only a single PDCCH message or a single PDSCH message is received by the UE 120 during the feedback window associated with Type-1 HARQ-ACK feedback codebook reporting. For example, the semi-static HARQ feedback codebook may be associated with a first size (for example, that is static or fixed, such as by the configuration information received by the UE 120 in the first operation 610), and a fallback HARQ feedback indication may be associated with a second size that is less than the first size. In some aspects, the second size may be 1 bit.

In some aspects, the UE 120 may determine whether to perform a fallback operation for the semi-static HARQ feedback codebook for multicast messages for all RNTIs together (for example, considering each RNTI). For example, the UE 120 may determine to transmit a fallback HARQ feedback indication based at least in part on, or otherwise associated with, not receiving another PDCCH message, associated with any RNTI (for example, any G-RNTI or any G-CS-RNTI), received during the feedback window. In other words, the UE 120 transmitting a fallback HARQ feedback indication (for example, in the sixth operation 635) may be based at least in part on, or otherwise associated with, not receiving another PDCCH message associated with any other G-RNTI during a feedback window indicated by the configuration information. For example, the UE 120 may transmit a fallback HARQ feedback indication (for example, in the sixth operation 635) based at least in part on, or otherwise associated with, determining that the UE 120 is to report HARQ-ACK information in a PUCCH only for a PDSCH reception scheduled by DCI format 1_0 with a counter DAI field value of 1 on a PCell of the UE 120, or a PDSCH reception scheduled by DCI format 4_1 (for example, scheduled by DCI received by the UE 120 in the third operation 620) with a counter DAI field value of 1 on the PCell, associated with any G-RNTI. For example, if the UE 120 receives a first multicast PDSCH message associated with a first G-RNTI and receives a second multicast PDSCH message associated with a second G-RNTI during the feedback window, then the UE 120 may determine that the fallback operation is not to be performed. In such examples, the UE 120 may transmit the semi-static HARQ feedback codebook (for example, the Type-1 HARQ ACK codebook) in the sixth operation 635. The network entity 605 may perform a blind decoding to determine if the Type-1 HARQ ACK codebook or the fallback HARQ feedback indication is transmitted by the UE 120.

As another example, the multicast messages received by the UE 120 in the third operation 620 or the fourth operation 625 may be SPS multicast messages. In such examples, the UE 120 may determine to transmit a single fallback HARQ feedback indication (for example, may determine to perform the fallback operation) based at least in part on, or otherwise associated with, determining that HARQ-ACK information to be reported by the UE 120 is associated only with one or more SPS PDSCH messages associated with any configured scheduling RNTI (CS-RNTI), only with a multicast SPS PDSCH release (for example, a PDCCH message associated with a DCI format 4_1 with a DAI counter field value of 1) associated with any G-CS-RNTI, or only with one or more SPS PDSCH messages received by the UE 120 associated with any G-CS-RNTI. For example, the UE 120 may determine to transmit a single fallback HARQ feedback indication associated with the one or more multicast PDSCH messages based at least in part on, or otherwise associated with, multicast messages, associated with any G-CS-RNTI, received during a feedback window indicated by the configuration information being only a single PDCCH message associated with any G-CS-RNTI (for example, received by the UE 120 in the third operation 620) or being one or more SPS PDSCH messages (for example, received by the UE 120 in the fourth operation 625) activated by a single PDCCH message that is associated with any G-CS-RNTI (for example, received by the UE 120 in the third operation 620).

In other words, transmitting the one or more fallback HARQ feedback indications (for example, in the sixth operation 635) may be based at least in part on, or otherwise associated with, not receiving another multicast message associated with any G-CS-RNTI during a feedback window. For example, if the UE 120 receives a first multicast SPS release or first one or more multicast SPS PDSCH messages associated with a first G-CS-RNTI and a second multicast SPS release or second one or more multicast SPS PDSCH messages associated with a second G-CS-RNTI during the feedback window, then the UE 120 may determine to not perform the fallback operation. In such examples, the UE 120 may transmit the semi-static HARQ feedback codebook (for example, the Type-1 HARQ ACK codebook) in the sixth operation 635.

In some other aspects, the UE 120 may determine to transmit a fallback HARQ feedback indication based at least in part on, or otherwise associated with, PDCCH messages or PDSCH messages, associated with a given RNTI (for example, a given G-RNTI or a given G-CS-RNTI), received during the feedback window being only the PDCCH message or PDSCH message associated with the given RNTI (for example, received by the UE 120 in the third operation 620). For example, the UE 120 may determine whether to transmit fallback HARQ feedback indications separately for different RNTIs. For example, the UE 120 may receive a first PDCCH message (for example, in the third operation 620), associated with a first G-RNTI during the feedback window associated with the semi-static HARQ feedback codebook. Additionally, the UE 120 may receive a second PDCCH message (for example, in the third operation 620), associated with a second G-RNTI during the feedback window associated with the semi-static HARQ feedback codebook. The UE 120 may determine to perform the fallback operation associated with the first G-RNTI so long as no other PDCCH messages (or PDSCH messages) associated with the first G-RNTI are received by the UE 120 during the feedback window. Similarly, the UE 120 may determine to perform the fallback operation associated with the second G-RNTI so long as no other PDCCH messages (or PDSCH messages) associated with the second G-RNTI are received by the UE 120 during the feedback window.

For example, the UE 120 may determine to perform the fallback operation based at least in part on, or otherwise associated with, determining that the UE 120 is to report HARQ-ACK information in a PUCCH only for a PDSCH reception scheduled by DCI format 1_0 with a counter DAI field value of 1 on the PCell, or only for a PDSCH reception scheduled by DCI format 4_1 with a counter DAI field value of 1 on the PCell, associated with a given G-RNTI. For example, in the sixth operation 635, the UE 120 may transmit, and the network entity 605 may receive, a first fallback HARQ feedback indication associated with the first G-RNTI and a second fallback HARQ feedback indication associated with the second G-RNTI (for example, based at least in part on, or otherwise associated with, determining to perform the fallback operation for the first G-RNTI and the second G-RNTI separately). In other words, the UE 120 may transmit, and the network entity 605 may receive, a separate HARQ feedback indication associated with each G-RNTI detected during a feedback window associated with the semi-static HARQ feedback codebook (for example, based at least in part on, or otherwise associated with, the UE 120 determining to perform the fallback operation for each G-RNTI separately).

As another example, the multicast messages received by the UE 120 in the third operation 620 or the fourth operation 625 may be SPS multicast messages. In such examples, the UE 120 may determine to perform the fallback operation for each G-CS-RNTI separately. For example, the UE 120 may determine to perform the fallback operation based at least in part on, or otherwise associated with, determining that the UE 120 is to report HARQ-ACK information in a PUCCH only for a SPS PDSCH release indicated by DCI format 1_0 with a counter DAI field value of 1, only for SPS PDSCH reception(s) associated with a given CS-RNTI, only for an SPS PDSCH release indicated by DCI format 4_1 with a counter DAI field value of 1 and associated with a given G-CS-RNTI, or only for SPS PDSCH reception(s) associated with a given G-CS-RNTI. In other words, the UE 120 may determine whether conditions for transmitting a fallback HARQ feedback indication are met separately for each G-CS-RNTI.

For example, in the sixth operation 635, the UE 120 may transmit, and the network entity 605 may receive, a first fallback HARQ feedback indication associated with a first G-CS-RNTI and a second fallback HARQ feedback indication associated with a second G-CS-RNTI (for example, based at least in part on, or otherwise associated with, determining to perform the fallback operation for the first G-CS-RNTI and the second G-CS-RNTI separately in the fifth operation 630). In other words, the UE 120 may transmit, and the network entity 605 may receive, a separate HARQ feedback indication associated with each G-CS-RNTI detected during a feedback window associated with the semi-static HARQ feedback codebook (for example, based at least in part on, or otherwise associated with, the UE 120 determining to perform the fallback operation for each G-CS-RNTI separately in the fifth operation 630).

In some aspects, in the fifth operation 630, the UE 120 may determine whether to perform the fallback operation for a given RNTI based at least in part on, or otherwise associated with, whether feedback is enabled for the given RNTI. For example, a feedback configuration for a given RNTI may indicate whether feedback is enabled or disabled for the given RNTI. For example, an RRC configuration or a group-common DCI (for example, associated with DCI format 4_2) may indicate whether feedback is enabled or disabled for a given RNTI (for example, for a given G-RNTI or a given G-CS-RNTI). In some aspects, the UE 120 may determine to perform the fallback operation associated with a given RNTI based at least in part on, or otherwise associated with, feedback being enabled for the given RNTI. In other words, if feedback is disabled for the given RNTI, then the UE 120 may determine that the fallback operation is not to be performed (for example, and may transmit the Type-1 HARQ ACK codebook in the sixth operation 635). In some other aspects, if feedback is disabled for the given RNTI, then the UE 120 may determine that a fallback HARQ feedback indication is to be transmitted, but with a NACK indication regardless of whether multicast message(s) were successfully received by the UE 120. In other words, the UE 120 may perform the fallback operation with a NACK indication (for example, a NACK bit) for the multicast RNTI (or multicast transport block) with feedback disabled. For example, in the sixth operation 635, the UE 120 may transmit, and the network entity 605 may receive, a NACK indication regardless of whether the one or more multicast PDSCH messages are successfully received by the UE 120 when feedback is disabled for the one or more multicast PDSCH messages.

In some aspects, in the fifth operation 630, the UE 120 may determine whether to perform the fallback operation for a given RNTI based at least in part on, or otherwise associated with, a feedback type associated with a given RNTI (for example, that is associated with the fallback operation). For example, a feedback configuration for a given RNTI may indicate the feedback type associated with the given RNTI. Feedback types may include ACK/NACK-based feedback (for example, where the UE 120 is to transmit ACK indications or NACK indications based at least in part on, or otherwise associated with, whether a message is successfully received by the UE 120), or NACK-only-based feedback (for example, where the UE 120 does not transmit feedback if a message is successfully received and transmits NACK feedback if a message is not successfully received). For example, in some aspects, the UE 120 may determine to perform the fallback operation based at least in part on, or otherwise associated with, the RNTI, that is associated with the fallback operation, being associated with ACK/NACK feedback. In other words, the UE 120 may transmit (for example, in the sixth operation 635) one or more fallback HARQ feedback indications based at least in part on, or otherwise associated with, the RNTI being associated with ACK/NACK feedback. For example, if the RNTI, that is associated with the fallback operation, is associated with NACK-only-based feedback, then the UE 120 may determine that the fallback operation is not to be performed. Alternatively, if the RNTI, that is associated with the fallback operation, is associated with NACK-only-based feedback, then the UE 120 may determine that the HARQ-ACK feedback information associated with the RNTI is to be transformed to ACK/NACK feedback (for example, from NACK-only feedback). For example, the UE 120 may transmit (for example, in the sixth operation 635) an ACK or a NACK indication associated with the one or more multicast PDSCH messages based at least in part on, or otherwise associated with, whether the one or more multicast PDSCH messages are successfully received as part of the fallback operation (for example, even though the RNTI associated with the one or more multicast PDSCH messages is associated with NACK-only-based feedback).

As described above, in the sixth operation 635, the UE 120 may transmit, and the network entity 605 may receive, one or more fallback HARQ feedback indications, associated with the one or more multicast PDSCH messages (for example, received by the UE 120 in the fourth operation 625), in accordance with the configuration information (for example, received by the UE 120 in the first operation 610) and based at least in part on, or otherwise associated with, an RNTI associated with the one or more multicast PDSCH messages or multicast PDCCH message, or a feedback configuration associated with the RNTI, among other examples. For example, the UE 120 may transmit the one or more fallback HARQ feedback indications based at least in part on, or otherwise associated with, determining that the fallback operation is to be performed (for example, in the fifth operation 630). If the UE 120 determines that the fallback operation is not to be performed (for example, in the fifth operation 630), then the UE 120 may transmit, and the network entity 605 may receive, the Type-1 HARQ ACK codebook (for example, in the sixth operation 635).

FIG. 7 is a flowchart illustrating an example process 700 performed, for example, by a UE in accordance with the present disclosure. Example process 700 is an example where the UE (for example, the UE 120) performs operations associated with fallback operation for a semi-static HARQ feedback codebook for multicast.

As shown in FIG. 7, in some aspects, process 700 may include receiving, from a network entity, configuration information associated with a semi-static HARQ feedback codebook for multicast messages (block 710). For example, the UE (such as by using communication manager 140 or reception component 902, depicted in FIG. 9) may receive, from a network entity, configuration information associated with a semi-static HARQ feedback codebook for multicast messages, as described above.

As further shown in FIG. 7, in some aspects, process 700 may include receiving, from the network entity, a PDCCH message, associated with an RNTI, scheduling one or more multicast PDSCH messages (block 720). For example, the UE (such as by using communication manager 140 or reception component 902, depicted in FIG. 9) may receive, from the network entity, a PDCCH message, associated with an RNTI, scheduling one or more multicast PDSCH messages, as described above.

As further shown in FIG. 7, in some aspects, process 700 may include transmitting, to the network entity, one or more fallback HARQ feedback indications, associated with the one or more multicast PDSCH messages, in lieu of transmitting the semi-static HARQ feedback codebook, in accordance with the configuration information and associated with at least one of the RNTI or a feedback configuration associated with the RNTI (block 730). For example, the UE (such as by using communication manager 140 or transmission component 904, depicted in FIG. 9) may transmit, to the network entity, one or more fallback HARQ feedback indications, associated with the one or more multicast PDSCH messages, in lieu of transmitting the semi-static HARQ feedback codebook, in accordance with the configuration information and associated with at least one of the RNTI or a feedback configuration associated with the RNTI, as described above.

Process 700 may include additional aspects, such as any single aspect or any combination of aspects described below or in connection with one or more other processes described elsewhere herein.

In a first additional aspect, the PDCCH message includes a DCI message having a DCI format 4_1.

In a second additional aspect, alone or in combination with the first aspect, the semi-static HARQ feedback codebook is associated with a feedback window, wherein the PDCCH message is received during the feedback window, wherein the RNTI is a G-RNTI, and transmitting the one or more fallback HARQ feedback indications includes transmitting a single fallback HARQ feedback indication associated with the one or more multicast PDSCH messages associated with not receiving another PDCCH message, associated with any G-RNTI including the G-RNTI, during the feedback window.

In a third additional aspect, alone or in combination with one or more of the first and second aspects, the RNTI is a G-RNTI, and transmitting the one or more fallback HARQ feedback indications is associated with not receiving another PDCCH message associated with any G-RNTI during a feedback window associated with the semi-static HARQ feedback codebook.

In a fourth additional aspect, alone or in combination with one or more of the first through third aspects, the RNTI is a first G-RNTI, the PDCCH message is received during a feedback window associated with the semi-static HARQ feedback codebook, and process 700 includes receiving, during the feedback window, another PDCCH message, associated with a second G-RNTI, scheduling one or more other multicast PDSCH messages, and transmitting the one or more fallback HARQ feedback indications includes transmitting a first fallback HARQ feedback indication associated with the PDCCH message and the first G-RNTI, and transmitting a second fallback HARQ feedback indication associated with the other PDCCH message and the second G-RNTI.

In a fifth additional aspect, alone or in combination with one or more of the first through fourth aspects, the RNTI is a first G-RNTI, and transmitting the one or more fallback HARQ feedback indications includes transmitting a separate HARQ feedback indication associated with each G-RNTI detected during a feedback window associated with the semi-static HARQ feedback codebook.

In a sixth additional aspect, alone or in combination with one or more of the first through fifth aspects, the RNTI is a G-CS-RNTI, and transmitting the one or more fallback HARQ feedback indications includes transmitting a single fallback HARQ feedback indication associated with the one or more multicast PDSCH messages associated with not receiving another multicast message, associated with any G-CS-RNTI including the G-CS-RNTI, during a feedback window associated with the semi-static HARQ feedback codebook.

In a seventh additional aspect, alone or in combination with one or more of the first through sixth aspects, the one or more multicast PDSCH messages are SPS messages, the RNTI is a G-CS-RNTI, and transmitting the one or more fallback HARQ feedback indications is associated with not receiving another multicast message associated with any G-CS-RNTI during a feedback window associated with the semi-static HARQ feedback codebook.

In an eighth additional aspect, alone or in combination with one or more of the first through seventh aspects, the one or more multicast PDSCH messages are SPS messages, a first multicast PDSCH message, of the one or more PDSCH messages, is associated with a first G-CS-RNTI and a second multicast PDSCH message, of the one or more PDSCH messages, is associated with a second G-CS-RNTI, and transmitting the one or more fallback HARQ feedback indications includes transmitting a first fallback HARQ feedback indication associated with the first multicast PDSCH message and the first G-CS-RNTI, and transmitting a second fallback HARQ feedback indication associated with the second multicast PDSCH message and the second G-CS-RNTI.

In a ninth additional aspect, alone or in combination with one or more of the first through eighth aspects, the one or more multicast PDSCH messages are SPS messages, wherein the RNTI is a G-CS-RNTI, and transmitting the one or more fallback HARQ feedback indications includes transmitting a separate HARQ feedback indication associated with each G-CS-RNTI detected during a feedback window associated with the semi-static HARQ feedback codebook.

In a tenth additional aspect, alone or in combination with one or more of the first through ninth aspects, the feedback configuration indicates whether feedback is enabled or disabled for the RNTI, and transmitting the one or more fallback HARQ feedback indications is associated with feedback being enabled for the RNTI.

In an eleventh additional aspect, alone or in combination with one or more of the first through tenth aspects, the feedback configuration indicates that feedback is disabled for the RNTI, and transmitting the one or more fallback HARQ feedback indications includes transmitting a NACK indication regardless of whether the one or more multicast PDSCH messages are successfully received.

In a twelfth additional aspect, alone or in combination with one or more of the first through eleventh aspects, the feedback configuration indicates whether the RNTI is associated with ACK/NACK feedback or NACK only feedback, and transmitting the one or more fallback HARQ feedback indications is associated with the RNTI being associated with ACK/NACK feedback.

In a thirteenth additional aspect, alone or in combination with one or more of the first through twelfth aspects, the feedback configuration indicates that the RNTI is associated with NACK only feedback, and transmitting the one or more fallback HARQ feedback indications includes transmitting an ACK or NACK indication associated with the one or more multicast PDSCH messages associated with whether the one or more multicast PDSCH messages are successfully received.

In a fourteenth additional aspect, alone or in combination with one or more of the first through thirteenth aspects, process 700 includes transmitting, to the network entity, a capability message that indicates that the UE supports fallback HARQ feedback indications associated with the semi-static HARQ feedback codebook.

In a fifteenth additional aspect, alone or in combination with one or more of the first through fourteenth aspects, the UE supporting fallback HARQ feedback indications associated with the semi-static HARQ feedback codebook is associated with at least one of a type of multicast messages associated with the fallback HARQ feedback indications, a frequency band associated with the fallback HARQ feedback indications, or an FSPC associated with the fallback HARQ feedback indications.

In a sixteenth additional aspect, alone or in combination with one or more of the first through fifteenth aspects, the semi-static HARQ feedback codebook is a Type-1 HARQ-ACK codebook.

In a seventeenth additional aspect, alone or in combination with one or more of the first through sixteenth aspects, the one or more multicast PDSCH messages include dynamic grant multicast messages or SPS multicast messages.

In an eighteenth additional aspect, alone or in combination with one or more of the first through seventeenth aspects, the semi-static HARQ feedback codebook is associated with a first size, and a fallback HARQ feedback indication, of the one or more fallback HARQ feedback indications, is associated with a second size that is less than the first size.

In a nineteenth additional aspect, alone or in combination with one or more of the first through eighteenth aspects, the second size is 1 bit.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

FIG. 8 is a flowchart illustrating an example process 800 performed, for example, by a network entity in accordance with the present disclosure. Example process 800 is an example where the network entity (for example, network entity 605, the base station 110, the CU 310, a DU 330, or an RU 340, among other examples) performs operations associated with fallback operation for a semi-static HARQ feedback codebook for multicast.

As shown in FIG. 8, in some aspects, process 800 may include transmitting configuration information, for one or more UEs, associated with a semi-static HARQ feedback codebook for multicast messages (block 810). For example, the network entity (such as by using communication manager 150, communication manager 1008, or transmission component 1004, depicted in FIG. 10) may transmit configuration information, for one or more UEs, associated with a semi-static HARQ feedback codebook for multicast messages, as described above.

As further shown in FIG. 8, in some aspects, process 800 may include transmitting a message, for the one or more UEs, associated with an RNTI, scheduling one or more multicast PDSCH messages (block 820). For example, the network entity (such as by using communication manager 150, communication manager 1008, or transmission component 1004, depicted in FIG. 10) may transmit a message, for the one or more UEs, associated with an RNTI, scheduling one or more multicast PDSCH messages, as described above.

As further shown in FIG. 8, in some aspects, process 800 may include receiving one or more fallback HARQ feedback indications, for a UE of the one or more UEs, associated with the one or more multicast PDSCH messages, in lieu of receiving the semi-static HARQ feedback codebook, in accordance with the configuration information and associated with at least one of the RNTI or a feedback configuration associated with the RNTI (block 830). For example, the network entity (such as by using communication manager 150, communication manager 1008, or reception component 1002, depicted in FIG. 10) may receive one or more fallback HARQ feedback indications, for a UE of the one or more UEs, associated with the one or more multicast PDSCH messages, in lieu of receiving the semi-static HARQ feedback codebook, in accordance with the configuration information and associated with at least one of the RNTI or a feedback configuration associated with the RNTI, as described above.

Process 800 may include additional aspects, such as any single aspect or any combination of aspects described below or in connection with one or more other processes described elsewhere herein.

In a first additional aspect, the message includes a DCI message having a DCI format 4_1.

In a second additional aspect, alone or in combination with the first aspect, the semi-static HARQ feedback codebook is associated with a feedback window, wherein the message is received during the feedback window, wherein the RNTI is a G-RNTI, and receiving the one or more fallback HARQ feedback indications includes receiving a single fallback HARQ feedback indication associated with the one or more multicast PDSCH messages associated with not transmitting another message, associated with any G-RNTI including the G-RNTI, during the feedback window.

In a third additional aspect, alone or in combination with one or more of the first and second aspects, the RNTI is a G-RNTI, and receiving the one or more fallback HARQ feedback indications is associated with not transmitting another message associated with any G-RNTI during a feedback window associated with the semi-static HARQ feedback codebook.

In a fourth additional aspect, alone or in combination with one or more of the first through third aspects, the RNTI is a first G-RNTI, the message is transmitted during a feedback window associated with the semi-static HARQ feedback codebook, and process 800 includes transmitting, during the feedback window, another message, associated with a second G-RNTI, scheduling one or more other multicast PDSCH messages, and receiving the one or more fallback HARQ feedback indications includes receiving a first fallback HARQ feedback indication associated with the message and the first G-RNTI, and receiving a second fallback HARQ feedback indication associated with the other message and the second G-RNTI.

In a fifth additional aspect, alone or in combination with one or more of the first through fourth aspects, the RNTI is a first G-RNTI, and receiving the one or more fallback HARQ feedback indications includes receiving a separate HARQ feedback indication associated with each G-RNTI associated with messages transmitted during a feedback window associated with the semi-static HARQ feedback codebook.

In a sixth additional aspect, alone or in combination with one or more of the first through fifth aspects, the RNTI is a G-CS-RNTI, and receiving the one or more fallback HARQ feedback indications includes receiving a single fallback HARQ feedback indication associated with the one or more multicast PDSCH messages associated with not transmitting another multicast message, associated with any G-CS-RNTI including the G-CS-RNTI, during a feedback window associated with the semi-static HARQ feedback codebook.

In a seventh additional aspect, alone or in combination with one or more of the first through sixth aspects, the one or more multicast PDSCH messages are SPS messages, the RNTI is a G-CS-RNTI, and receiving the one or more fallback HARQ feedback indications is associated with not transmitting another multicast message associated with any G-CS-RNTI during a feedback window associated with the semi-static HARQ feedback codebook.

In an eighth additional aspect, alone or in combination with one or more of the first through seventh aspects, the one or more multicast PDSCH messages are SPS messages, a first multicast PDSCH message, of the one or more PDSCH messages, is associated with a first G-CS-RNTI and a second multicast PDSCH message, of the one or more PDSCH messages, is associated with a second G-CS-RNTI, and receiving the one or more fallback HARQ feedback indications includes receiving a first fallback HARQ feedback indication associated with the first multicast PDSCH message and the first G-CS-RNTI, and receiving a second fallback HARQ feedback indication associated with the second multicast PDSCH message and the second G-CS-RNTI.

In a ninth additional aspect, alone or in combination with one or more of the first through eighth aspects, the one or more multicast PDSCH messages are SPS messages, the RNTI is a G-CS-RNTI, and receiving the one or more fallback HARQ feedback indications includes receiving a separate HARQ feedback indication associated with each G-CS-RNTI associated with messages during a feedback window associated with the semi-static HARQ feedback codebook.

In a tenth additional aspect, alone or in combination with one or more of the first through ninth aspects, the feedback configuration indicates whether feedback is enabled or disabled for the RNTI, and receiving the one or more fallback HARQ feedback indications is associated with feedback being enabled for the RNTI.

In an eleventh additional aspect, alone or in combination with one or more of the first through tenth aspects, the feedback configuration indicates that feedback is disabled for the RNTI, and receiving the one or more fallback HARQ feedback indications includes receiving a NACK indication regardless of whether the one or more multicast PDSCH messages are successfully received.

In a twelfth additional aspect, alone or in combination with one or more of the first through eleventh aspects, the feedback configuration indicates whether the RNTI is associated with ACK/NACK feedback or NACK only feedback, and receiving the one or more fallback HARQ feedback indications is associated with the RNTI being associated with ACK/NACK feedback.

In a thirteenth additional aspect, alone or in combination with one or more of the first through twelfth aspects, the feedback configuration indicates that the RNTI is associated with NACK only feedback, and receiving the one or more fallback HARQ feedback indications includes receiving an ACK or NACK indication associated with the one or more multicast PDSCH messages associated with whether the one or more multicast PDSCH messages are successfully received.

In a fourteenth additional aspect, alone or in combination with one or more of the first through thirteenth aspects, process 800 includes receiving, from the UE, a capability message that indicates that the UE supports fallback HARQ feedback indications associated with the semi-static HARQ feedback codebook.

In a fifteenth additional aspect, alone or in combination with one or more of the first through fourteenth aspects, the UE supporting fallback HARQ feedback indications associated with the semi-static HARQ feedback codebook is associated with at least one of a type of multicast messages associated with the fallback HARQ feedback indications, a frequency band associated with the fallback HARQ feedback indications, or an FSPC associated with the fallback HARQ feedback indications.

In a sixteenth additional aspect, alone or in combination with one or more of the first through fifteenth aspects, the semi-static HARQ feedback codebook is a Type-1 HARQ-ACK codebook.

In a seventeenth additional aspect, alone or in combination with one or more of the first through sixteenth aspects, the one or more multicast PDSCH messages include dynamic grant multicast messages or SPS multicast messages.

In an eighteenth additional aspect, alone or in combination with one or more of the first through seventeenth aspects, the semi-static HARQ feedback codebook is associated with a first size, and a fallback HARQ feedback indication, of the one or more fallback HARQ feedback indications, is associated with a second size that is less than the first size.

In a nineteenth additional aspect, alone or in combination with one or more of the first through eighteenth aspects, the second size is 1 bit.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
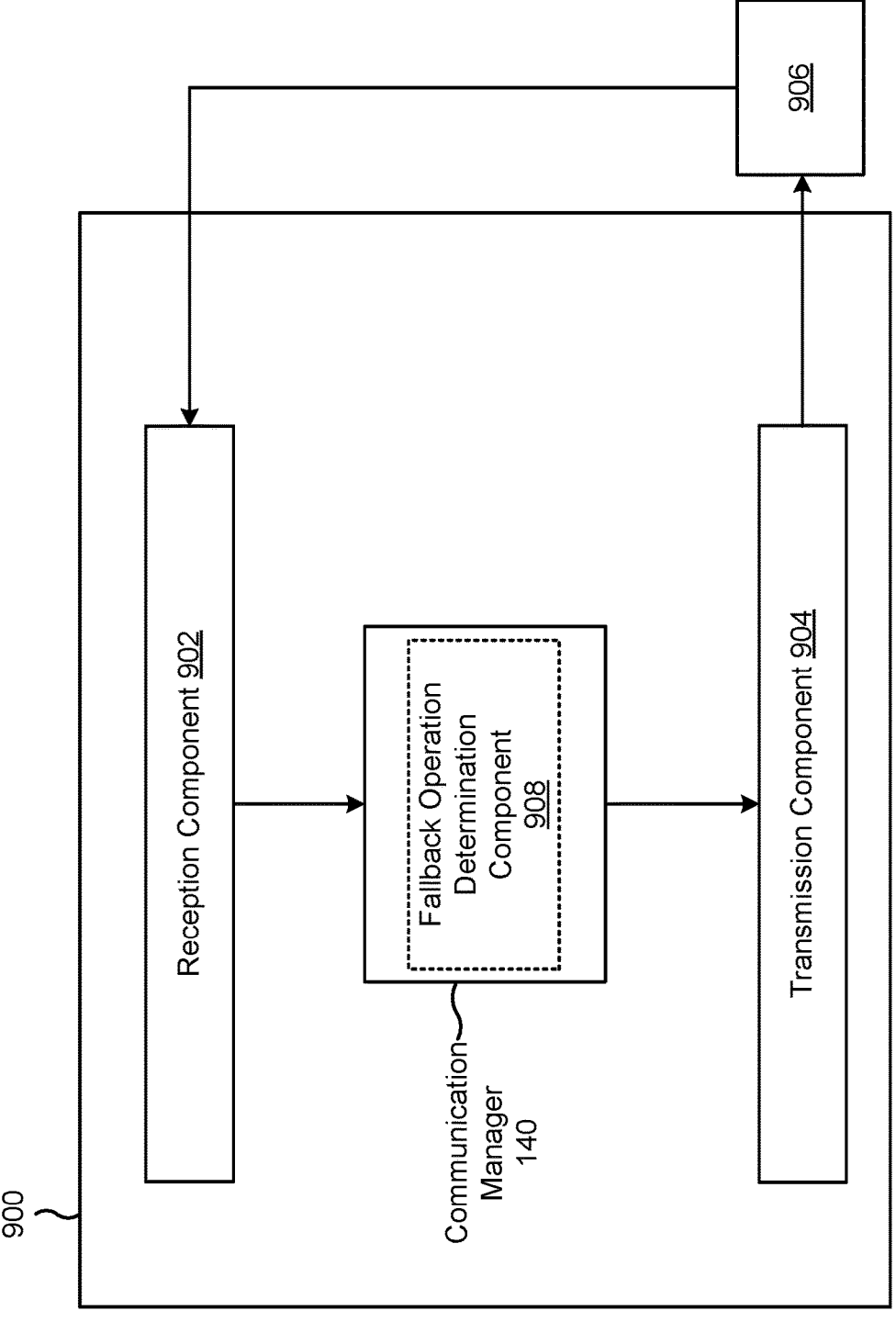
FIG. 9 is a diagram of an example apparatus for wireless communication in accordance with the present disclosure.

FIG. 9 is a diagram of an example apparatus 900 for wireless communication in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIG. 6. Additionally or alternatively, the apparatus 900 may be configured to perform one or more processes described herein, such as process 700 of FIG. 7, or a combination thereof. In some aspects, the apparatus 900 may include one or more components of the UE described above in connection with FIG. 2.

The reception component 902 may receive communications, such as reference signals, control information, data communications, or a combination thereof, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The communication manager 140 may receive or may cause the reception component 902 to receive, from a network entity, configuration information associated with a semi-static HARQ feedback codebook for multicast messages. The communication manager 140 may receive or may cause the reception component 902 to receive, from the network entity, a PDCCH message, associated with an RNTI, scheduling one or more multicast PDSCH messages. The communication manager 140 may transmit or may cause the transmission component 904 to transmit, to the network entity, one or more fallback HARQ feedback indications, associated with the one or more multicast PDSCH messages, in lieu of transmitting the semi-static HARQ feedback codebook, in accordance with the configuration information and associated with at least one of the RNTI or a feedback configuration associated with the RNTI. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a fallback operation determination component 908. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive, from a network entity, configuration information associated with a semi-static HARQ feedback codebook for multicast messages. The reception component 902 may receive, from the network entity, a PDCCH message, associated with an RNTI, scheduling one or more multicast PDSCH messages. The transmission component 904 may transmit, to the network entity, one or more fallback HARQ feedback indications, associated with the one or more multicast PDSCH messages, in lieu of transmitting the semi-static HARQ feedback codebook, in accordance with the configuration information and associated with at least one of the RNTI or a feedback configuration associated with the RNTI.

The fallback operation determination component 908 may determine to perform a fallback operation associated with the semi-static HARQ feedback codebook. The transmission component 904 may transmit the one or more fallback HARQ feedback indications in lieu of transmitting the semi-static HARQ feedback codebook associated with determining to perform the fallback operation.

The transmission component 904 may transmit, to the network entity, a capability message that indicates that the UE supports fallback HARQ feedback indications associated with the semi-static HARQ feedback codebook.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
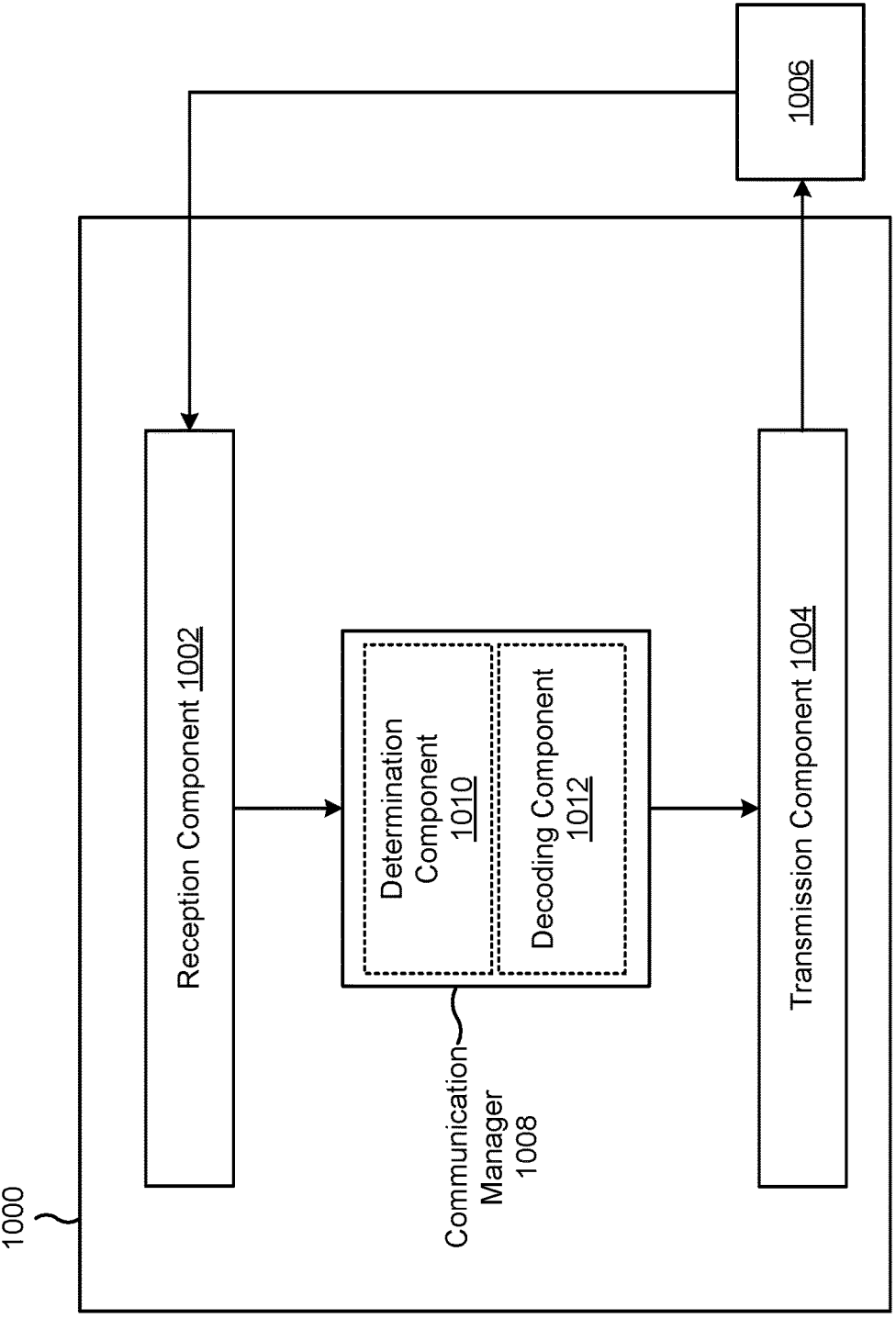
FIG. 10 is a diagram of an example apparatus for wireless communication in accordance with the present disclosure.

FIG. 10 is a diagram of an example apparatus 1000 for wireless communication in accordance with the present disclosure. The apparatus 1000 may be a network entity, or a network entity may include the apparatus 1000. In some aspects, the apparatus 1000 includes a reception component 1002, a transmission component 1004, and a communication manager 1008, which may be in communication with one another (for example, via one or more buses). In some aspects, the communication manager 1008 may include one or more antennas, a modem, a controller/processor, a memory, or a combination thereof, of the base station described in connection with FIG. 2. The communication manager 1008 may be, or be similar to, the communication manager 150 depicted in FIGS. 1 and 2. For example, in some aspects, the communication manager 1008 may be configured to perform one or more of the functions described as being performed by the communication manager 150. In some aspects, the communication manager 1008 may include the reception component 1002 or the transmission component 1004. As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIG. 6. Additionally or alternatively, the apparatus 1000 may be configured to perform one or more processes described herein, such as process 800 of FIG. 8, or a combination thereof. In some aspects, the apparatus 1000 may include one or more components of the network entity described above in connection with FIG. 2.

The reception component 1002 may receive communications, such as reference signals, control information, data communications, or a combination thereof, from the apparatus 1006. The reception component 1002 may provide received communications to one or more other components of the apparatus 1000, such as the communication manager 1008. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, a memory, or a combination thereof, of the network entity described above in connection with FIG. 2.

The transmission component 1004 may transmit communications, such as reference signals, control information, data communications, or a combination thereof, to the apparatus 1006. In some aspects, the communication manager 1008 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity described above in connection with FIG. 2. In some aspects, the transmission component 1004 may be co-located with the reception component 1002 in a transceiver.

The communication manager 1008 may transmit or may cause the transmission component 1004 to transmit configuration information associated with a semi-static HARQ feedback codebook for multicast messages. The communication manager 1008 may transmit or may cause the transmission component 1004 to transmit a message, associated with an RNTI, scheduling one or more multicast PDSCH messages. The communication manager 1008 may receive or may cause the reception component 1002 to receive one or more fallback HARQ feedback indications, associated with the one or more multicast PDSCH messages, in lieu of receiving the semi-static HARQ feedback codebook, in accordance with the configuration information and associated with at least one of the RNTI or a feedback configuration associated with the RNTI. In some aspects, the communication manager 1008 may perform one or more operations described elsewhere herein as being performed by one or more components of the communication manager 1008.

The communication manager 1008 may include a controller/processor, a memory, a scheduler, a communication unit, or a combination thereof, of the network entity described above in connection with FIG. 2. In some aspects, the communication manager 1008 includes a set of components, such as a determination component 1010, a decoding component 1012, or a combination thereof. Alternatively, the set of components may be separate and distinct from the communication manager 1008. In some aspects, one or more components of the set of components may include or may be implemented within a controller/processor, a memory, a scheduler, a communication unit, or a combination thereof, of the network entity described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1004 may transmit, to one or more UEs, configuration information associated with a semi-static HARQ feedback codebook for multicast messages. The transmission component 1004 may transmit, to the one or more UEs, a PDCCH message, associated with an RNTI, scheduling one or more multicast PDSCH messages. The reception component 1002 may receive, from a UE of the one or more UEs, one or more fallback HARQ feedback indications, associated with the one or more multicast PDSCH messages, in lieu of receiving the semi-static HARQ feedback codebook, in accordance with the configuration information and associated with at least one of the RNTI or a feedback configuration associated with the RNTI.

The determination component 1010 may determine the configuration information. The decoding component 1012 may perform blind decoding to identify that the UE transmitted the one or more fallback HARQ feedback indications in lieu of receiving the semi-static HARQ feedback codebook.

The reception component 1002 may receive, from the UE, a capability message that indicates that the UE supports fallback HARQ feedback indications associated with the semi-static HARQ feedback codebook. The determination component 1010 may determine the configuration information associated with receiving the capability message.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a network entity, configuration information associated with a semi-static hybrid automatic repeat request (HARQ) feedback codebook for multicast messages; receiving, from the network entity, a physical downlink control channel (PDCCH) message, associated with a radio network temporary identifier (RNTI), scheduling one or more multicast physical downlink shared channel (PDSCH) messages; and transmitting, to the network entity, one or more fallback HARQ feedback indications, associated with the one or more multicast PDSCH messages, in lieu of transmitting the semi-static HARQ feedback codebook, in accordance with the configuration information and associated with at least one of the RNTI or a feedback configuration associated with the RNTI.

Aspect 2: The method of Aspect 1, wherein the PDCCH message includes a downlink control information (DCI) message having a DCI format 4_1.

Aspect 3: The method of any of Aspects 1-2, wherein the semi-static HARQ feedback codebook is associated with a feedback window, wherein the PDCCH message is received during the feedback window, wherein the RNTI is a group common RNTI (G-RNTI), and wherein transmitting the one or more fallback HARQ feedback indications comprises: transmitting a single fallback HARQ feedback indication associated with the one or more multicast PDSCH messages associated with not receiving another PDCCH message, associated with any G-RNTI including the G-RNTI, during the feedback window.

Aspect 4: The method of any of Aspects 1-3, wherein the RNTI is a group common RNTI (G-RNTI), and wherein transmitting the one or more fallback HARQ feedback indications is associated with not receiving another PDCCH message associated with any G-RNTI during a feedback window associated with the semi-static HARQ feedback codebook.

Aspect 5: The method of any of Aspects 1-2, wherein the RNTI is a first group common RNTI (G-RNTI), wherein the PDCCH message is received during a feedback window associated with the semi-static HARQ feedback codebook, the method further comprising: receiving, during the feedback window, another PDCCH message, associated with a second G-RNTI, scheduling one or more other multicast PDSCH messages, and wherein transmitting the one or more fallback HARQ feedback indications comprises: transmitting a first fallback HARQ feedback indication associated with the PDCCH message and the first G-RNTI; and transmitting a second fallback HARQ feedback indication associated with the other PDCCH message and the second G-RNTI.

Aspect 6: The method of any of Aspects 1-2, and 5, wherein the RNTI is a first group common RNTI (G-RNTI), and wherein transmitting the one or more fallback HARQ feedback indications comprises: transmitting a separate HARQ feedback indication associated with each G-RNTI detected during a feedback window associated with the semi-static HARQ feedback codebook.

Aspect 7: The method of any of Aspects 1-2, wherein the RNTI is a group common configured scheduling RNTI (G-CS-RNTI), and wherein transmitting the one or more fallback HARQ feedback indications comprises: transmitting a single fallback HARQ feedback indication associated with the one or more multicast PDSCH messages associated with not receiving another multicast message, associated with any G-CS-RNTI including the G-CS-RNTI, during a feedback window associated with the semi-static HARQ feedback codebook.

Aspect 8: The method of any of Aspects 1-2 and 7, wherein the one or more multicast PDSCH messages are semi-persistent scheduling (SPS) messages, wherein the RNTI is a group common configured scheduling RNTI (G-CS-RNTI), and wherein transmitting the one or more fallback HARQ feedback indications is associated with not receiving another multicast message associated with any G-CS-RNTI during a feedback window associated with the semi-static HARQ feedback codebook.

Aspect 9: The method of any of Aspects 1-2, wherein the one or more multicast PDSCH messages are semi-persistent scheduling (SPS) messages, wherein a first multicast PDSCH message, of the one or more PDSCH messages, is associated with a first group common configured scheduling RNTI (G-CS-RNTI) and a second multicast PDSCH message, of the one or more PDSCH messages, is associated with a second G-CS-RNTI, and wherein transmitting the one or more fallback HARQ feedback indications comprises: transmitting a first fallback HARQ feedback indication associated with the first multicast PDSCH message and the first G-CS-RNTI; and transmitting a second fallback HARQ feedback indication associated with the second multicast PDSCH message and the second G-CS-RNTI.

Aspect 10: The method of any of Aspects 1-2 and 9, wherein the one or more multicast PDSCH messages are semi-persistent scheduling (SPS) messages, wherein the RNTI is a group common configured scheduling RNTI (G-CS-RNTI), and wherein transmitting the one or more fallback HARQ feedback indications comprises: transmitting a separate HARQ feedback indication associated with each G-CS-RNTI detected during a feedback window associated with the semi-static HARQ feedback codebook.

Aspect 11: The method of any of Aspects 1-10, wherein the feedback configuration indicates whether feedback is enabled or disabled for the RNTI, and wherein transmitting the one or more fallback HARQ feedback indications is associated with feedback being enabled for the RNTI.

Aspect 12: The method of any of Aspects 1-11, wherein the feedback configuration indicates that feedback is disabled for the RNTI, and wherein transmitting the one or more fallback HARQ feedback indications comprises: transmitting a negative acknowledgement (NACK) indication regardless of whether the one or more multicast PDSCH messages are successfully received.

Aspect 13: The method of any of Aspects 1-12, wherein the feedback configuration indicates whether the RNTI is associated with acknowledgement (ACK) and negative ACK (NACK) (ACK/NACK) feedback or NACK only feedback, and wherein transmitting the one or more fallback HARQ feedback indications is associated with the RNTI being associated with ACK/NACK feedback.

Aspect 14: The method of any of Aspects 1-13, wherein the feedback configuration indicates that the RNTI is associated with negative acknowledgement (NACK) only feedback, and wherein transmitting the one or more fallback HARQ feedback indications comprises: transmitting an acknowledgement (ACK) or NACK indication associated with the one or more multicast PDSCH messages associated with whether the one or more multicast PDSCH messages are successfully received.

Aspect 15: The method of any of Aspects 1-14, further comprising: transmitting, to the network entity, a capability message that indicates that the UE supports fallback HARQ feedback indications associated with the semi-static HARQ feedback codebook.

Aspect 16: The method of Aspect 15, wherein the UE supporting fallback HARQ feedback indications associated with the semi-static HARQ feedback codebook is associated with at least one of: a type of multicast messages associated with the fallback HARQ feedback indications, a frequency band associated with the fallback HARQ feedback indications, or a feature set per component-carrier (FSPC) associated with the fallback HARQ feedback indications.

Aspect 17: The method of any of Aspects 1-16, wherein the semi-static HARQ feedback codebook is a Type-1 HARQ-Acknowledgement (ACK) codebook.

Aspect 18: The method of any of Aspects 1-17, wherein the one or more multicast PDSCH messages include dynamic grant multicast messages or semi-persistent scheduling (SPS) multicast messages.

Aspect 19: The method of any of Aspects 1-18, wherein the semi-static HARQ feedback codebook is associated with a first size, and wherein a fallback HARQ feedback indication, of the one or more fallback HARQ feedback indications, is associated with a second size that is less than the first size.

Aspect 20: The method of Aspect 19, wherein the second size is 1 bit.

Aspect 21: The method of any of Aspects 1-20, wherein transmitting one or more fallback HARQ feedback indications is associated with the PDCCH message being associated with DCI format 4_1, with a counter downlink assignment index (DAI) field value of 1 on a primary cell (PCell) associated with the UE, and with feedback being enabled for the RNTI.

Aspect 22: A method of wireless communication performed by a network entity, comprising: transmitting configuration information, for one or more user equipments (UEs), associated with a semi-static hybrid automatic repeat request (HARQ) feedback codebook for multicast messages; transmitting a message, for the one or more UEs, associated with a radio network temporary identifier (RNTI), scheduling one or more multicast physical downlink shared channel (PDSCH) messages; and receiving one or more fallback HARQ feedback indications, for a UE of the one or more UEs, associated with the one or more multicast PDSCH messages, in lieu of receiving the semi-static HARQ feedback codebook, in accordance with the configuration information and associated with at least one of the RNTI or a feedback configuration associated with the RNTI.

Aspect 23: The method of Aspect 22, wherein the message includes a downlink control information (DCI) message having a DCI format 4_1.

Aspect 24: The method of any of Aspects 22-23, wherein the semi-static HARQ feedback codebook is associated with a feedback window, wherein the message is received during the feedback window, wherein the RNTI is a group common RNTI (G-RNTI), and wherein receiving the one or more fallback HARQ feedback indications comprises: receiving a single fallback HARQ feedback indication associated with the one or more multicast PDSCH messages associated with not transmitting another message, associated with any G-RNTI including the G-RNTI, during the feedback window.

Aspect 25: The method of any of Aspects 22-24, wherein the RNTI is a group common RNTI (G-RNTI), and wherein receiving the one or more fallback HARQ feedback indications is associated with not transmitting another message associated with any G-RNTI during a feedback window associated with the semi-static HARQ feedback codebook.

Aspect 26: The method of any of Aspects 22-23, wherein the RNTI is a first group common RNTI (G-RNTI), wherein the message is transmitted during a feedback window associated with the semi-static HARQ feedback codebook, the method further comprising: transmitting, during the feedback window, another message, associated with a second G-RNTI, scheduling one or more other multicast PDSCH messages, and wherein receiving the one or more fallback HARQ feedback indications comprises: receiving a first fallback HARQ feedback indication associated with the message and the first G-RNTI; and receiving a second fallback HARQ feedback indication associated with the other message and the second G-RNTI.

Aspect 27: The method of any of Aspects 22-23 and 26, wherein the RNTI is a first group common RNTI (G-RNTI), and wherein receiving the one or more fallback HARQ feedback indications comprises: receiving a separate HARQ feedback indication associated with each G-RNTI associated with messages transmitted during a feedback window associated with the semi-static HARQ feedback codebook.

Aspect 28: The method of any of Aspects 22-23, wherein the RNTI is a group common configured scheduling RNTI (G-CS-RNTI), and wherein receiving the one or more fallback HARQ feedback indications comprises: receiving a single fallback HARQ feedback indication associated with the one or more multicast PDSCH messages associated with not transmitting another multicast message, associated with any G-CS-RNTI including the G-CS-RNTI, during a feedback window associated with the semi-static HARQ feedback codebook.

Aspect 29: The method of any of Aspects 22-23 and 28, wherein the one or more multicast PDSCH messages are semi-persistent scheduling (SPS) messages, wherein the RNTI is a group common configured scheduling RNTI (G-CS-RNTI), and wherein receiving the one or more fallback HARQ feedback indications is associated with not transmitting another multicast message associated with any G-CS-RNTI during a feedback window associated with the semi-static HARQ feedback codebook.

Aspect 30: The method of any of Aspects 22-23, wherein the one or more multicast PDSCH messages are semi-persistent scheduling (SPS) messages, wherein a first multicast PDSCH message, of the one or more PDSCH messages, is associated with a first group common configured scheduling RNTI (G-CS-RNTI) and a second multicast PDSCH message, of the one or more PDSCH messages, is associated with a second G-CS-RNTI, and wherein receiving the one or more fallback HARQ feedback indications comprises: receiving a first fallback HARQ feedback indication associated with the first multicast PDSCH message and the first G-CS-RNTI; and receiving a second fallback HARQ feedback indication associated with the second multicast PDSCH message and the second G-CS-RNTI.

Aspect 31: The method of any of Aspects 22-23 and 30, wherein the one or more multicast PDSCH messages are semi-persistent scheduling (SPS) messages, wherein the RNTI is a group common configured scheduling RNTI (G-CS-RNTI), and wherein receiving the one or more fallback HARQ feedback indications comprises: receiving a separate HARQ feedback indication associated with each G-CS-RNTI associated with messages during a feedback window associated with the semi-static HARQ feedback codebook.

Aspect 32: The method of any of Aspects 22-31, wherein the feedback configuration indicates whether feedback is enabled or disabled for the RNTI, and wherein receiving the one or more fallback HARQ feedback indications is associated with feedback being enabled for the RNTI.

Aspect 33: The method of any of Aspects 22-32, wherein the feedback configuration indicates that feedback is disabled for the RNTI, and wherein receiving the one or more fallback HARQ feedback indications comprises: receiving a negative acknowledgement (NACK) indication regardless of whether the one or more multicast PDSCH messages are successfully received.

Aspect 34: The method of any of Aspects 22-33, wherein the feedback configuration indicates whether the RNTI is associated with acknowledgement (ACK) and negative ACK (NACK) (ACK/NACK) feedback or NACK only feedback, and wherein receiving the one or more fallback HARQ feedback indications is associated with the RNTI being associated with ACK/NACK feedback.

Aspect 35: The method of any of Aspects 22-34, wherein the feedback configuration indicates that the RNTI is associated with negative acknowledgement (NACK) only feedback, and wherein receiving the one or more fallback HARQ feedback indications comprises: receiving an acknowledgement (ACK) or NACK indication associated with the one or more multicast PDSCH messages associated with whether the one or more multicast PDSCH messages are successfully received.

Aspect 36: The method of any of Aspects 22-35, further comprising: receiving, from the UE, a capability message that indicates that the UE supports fallback HARQ feedback indications associated with the semi-static HARQ feedback codebook.

Aspect 37: The method of Aspect 36, wherein the UE supporting fallback HARQ feedback indications associated with the semi-static HARQ feedback codebook is associated with at least one of: a type of multicast messages associated with the fallback HARQ feedback indications, a frequency band associated with the fallback HARQ feedback indications, or a feature set per component-carrier (FSPC) associated with the fallback HARQ feedback indications.

Aspect 38: The method of any of Aspects 22-37, wherein the semi-static HARQ feedback codebook is a Type-1 HARQ-Acknowledgement (ACK) codebook.

Aspect 39: The method of any of Aspects 22-38, wherein the one or more multicast PDSCH messages include dynamic grant multicast messages or semi-persistent scheduling (SPS) multicast messages.

Aspect 40: The method of any of Aspects 22-39, wherein the semi-static HARQ feedback codebook is associated with a first size, and wherein a fallback HARQ feedback indication, of the one or more fallback HARQ feedback indications, is associated with a second size that is less than the first size.

Aspect 41: The method of Aspect 40, wherein the second size is 1 bit.

Aspect 42: The method of any of Aspects 22-41, wherein receiving one or more fallback HARQ feedback indications is associated with the message being associated with DCI format 4_1, with a counter downlink assignment index (DAI) field value of 1 on a primary cell (PCell) associated with the UE, and with feedback being enabled for the RNTI.

Aspect 43: An apparatus for wireless communication at a device, comprising a processor; memory coupled with the processor; and instructions stored in the memory and executable by the processor to cause the apparatus to perform the method of one or more of Aspects 1-21.

Aspect 44: A device for wireless communication, comprising a memory and one or more processors coupled to the memory, the one or more processors configured to perform the method of one or more of Aspects 1-21.

Aspect 45: An apparatus for wireless communication, comprising at least one means for performing the method of one or more of Aspects 1-21.

Aspect 46: A non-transitory computer-readable medium storing code for wireless communication, the code comprising instructions executable by a processor to perform the method of one or more of Aspects 1-21.

Aspect 47: A non-transitory computer-readable medium storing a set of instructions for wireless communication, the set of instructions comprising one or more instructions that, when executed by one or more processors of a device, cause the device to perform the method of one or more of Aspects 1-21.

Aspect 48: An apparatus for wireless communication at a device, comprising a processor; memory coupled with the processor; and instructions stored in the memory and executable by the processor to cause the apparatus to perform the method of one or more of Aspects 22-42.

Aspect 49: A device for wireless communication, comprising a memory and one or more processors coupled to the memory, the one or more processors configured to perform the method of one or more of Aspects 22-42.

Aspect 50: An apparatus for wireless communication, comprising at least one means for performing the method of one or more of Aspects 22-42.

Aspect 51: A non-transitory computer-readable medium storing code for wireless communication, the code comprising instructions executable by a processor to perform the method of one or more of Aspects 22-42.

Aspect 52: A non-transitory computer-readable medium storing a set of instructions for wireless communication, the set of instructions comprising one or more instructions that, when executed by one or more processors of a device, cause the device to perform the method of one or more of Aspects 22-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

at least one memory; and at least one processor communicatively coupled with the at least one memory, the at least one processor configured to cause the UE to:

receive, from a network entity, configuration information associated with a semi-static hybrid automatic repeat request (HARQ) feedback codebook for multicast messages, wherein the configuration information comprises an indication of a physical downlink shared channel (PDSCH) HARQ acknowledgement (ACK) codebook field with a value of semi-static;

receive, from the network entity, a downlink control information (DCI) message having a DCI format 4_1, associated with a radio network temporary identifier (RNTI), scheduling one or more multicast PDSCH messages; and transmit, to the network entity, one or more fallback HARQ feedback indications, associated with the one or more multicast PDSCH messages, in lieu of transmitting the semi-static HARQ feedback codebook, in accordance with the configuration information and associated with at least one of the RNTI or a feedback configuration associated with the RNTI, wherein feedback is reported for the one or more multicast PDSCH messages based at least in part on the one or more multicast PDSCH messages being received during a feedback window, wherein the feedback window is based at least in part on a quantity of time resources indicated in the DCI message having the DCI format 4_1.

2. The UE of claim 1, wherein the value of semi-static is for multicast.

3. The UE of claim 1, wherein the semi-static HARQ feedback codebook is associated with the feedback window, wherein the DCI message having the DCI format 4_1 is received during the feedback window, wherein the RNTI is a group common RNTI (G-RNTI), and wherein, to cause the UE to transmit the one or more fallback HARQ feedback indications, the at least one processor is configured to cause the UE to:

transmit a single fallback HARQ feedback indication associated with the one or more multicast PDSCH messages.

4. The UE of claim 1, wherein the RNTI is a group common RNTI (G-RNTI), wherein transmitting the one or more fallback HARQ feedback indications is associated with not receiving a physical downlink control channel (PDCCH) message associated with any G-RNTI during the feedback window, and wherein the feedback window is associated with the semi-static HARQ feedback codebook.

5. The UE of claim 1, wherein transmitting the one or more fallback HARQ feedback indications is associated with the DCI message having the DCI format 4_1, with a counter downlink assignment index (DAI) field value of 1 on a primary cell (PCell) associated with the UE, and with feedback being enabled for the RNTI.

6. The UE of claim 1, wherein the RNTI is a group common configured scheduling RNTI (G-CS-RNTI), and wherein, to cause the UE to transmit the one or more fallback HARQ feedback indications, the at least one processor is configured to cause the UE to:

transmit a single fallback HARQ feedback indication associated with the one or more multicast PDSCH messages.

7. The UE of claim 1, wherein the one or more multicast PDSCH messages are semi-persistent scheduling (SPS) messages, wherein the RNTI is a group common configured scheduling RNTI (G-CS-RNTI), wherein transmitting the one or more fallback HARQ feedback indications is associated with not receiving another multicast message associated with any G-CS-RNTI during the feedback window, and wherein the feedback window is associated with the semi-static HARQ feedback codebook.

8. The UE of claim 1, wherein the feedback configuration indicates whether feedback for the RNTI is enabled or disabled, and wherein transmitting the one or more fallback HARQ feedback indications is associated with the feedback for the RNTI being enabled.

9. The UE of claim 1, wherein the feedback configuration indicates that feedback is disabled for the RNTI, and wherein, to cause the UE to transmit the one or more fallback HARQ feedback indications, the at least one processor is configured to cause the UE to:

transmit a negative acknowledgement (NACK) indication regardless of whether the one or more multicast PDSCH messages are successfully received.

10. The UE of claim 1, wherein the feedback configuration indicates whether the RNTI is associated with ACK and negative ACK (NACK) (ACK/NACK) feedback or NACK only feedback, and wherein transmitting the one or more fallback HARQ feedback indications is associated with the RNTI being associated with the ACK/NACK feedback.

11. The UE of claim 1, wherein the at least one processor is further configured to cause the UE to:

transmit, to the network entity, a capability message that indicates that the UE supports fallback HARQ feedback indications associated with the semi-static HARQ feedback codebook.

12. The UE of claim 1, wherein the semi-static HARQ feedback codebook is a Type-1 HARQ-ACK codebook.

13. A network entity for wireless communication, comprising:

at least one memory; and at least one processor communicatively coupled with the at least one memory, the at least one processor configured to cause the network entity to:

transmit configuration information, for one or more user equipments (UEs), associated with a semi-static hybrid automatic repeat request (HARQ) feedback codebook for multicast messages, wherein the configuration information comprises an indication of a physical downlink shared channel (PDSCH) HARQ acknowledgement (ACK) codebook field with a value of semi-static;

transmit a downlink control information (DCI) message having a DCI format 4_1, for the one or more UEs, associated with a radio network temporary identifier (RNTI), scheduling one or more multicast PDSCH messages; and receive one or more fallback HARQ feedback indications, for a UE of the one or more UEs, associated with the one or more multicast PDSCH messages, in lieu of receiving the semi-static HARQ feedback codebook, in accordance with the configuration information and associated with at least one of the RNTI or a feedback configuration associated with the RNTI, wherein feedback is reported for the one or more multicast PDSCH messages based at least in part on the one or more multicast PDSCH messages being received during a feedback window, wherein the feedback window is based at least in part on a quantity of time resources indicated in the DCI message having the DCI format 4_1.

14. The network entity of claim 13, wherein the value of semi-static is for multicast.

15. The network entity of claim 13, wherein the RNTI is a group common configured scheduling RNTI (G-CS-RNTI), and wherein, to cause the network entity to receive the one or more fallback HARQ feedback indications, the at least one processor is configured to cause the network entity to:

receive a single fallback HARQ feedback indication associated with the one or more multicast PDSCH messages.

16. A method of wireless communication performed by a user equipment (UE), comprising:

receiving, from a network entity, configuration information associated with a semi-static hybrid automatic repeat request (HARQ) feedback codebook for multicast messages, wherein the configuration information comprises an indication of a physical downlink shared channel (PDSCH) HARQ acknowledgement (ACK) codebook field with a value of semi-static;

receiving, from the network entity, a downlink control information (DCI) message having a DCI format 4_1, associated with a radio network temporary identifier (RNTI), scheduling one or more multicast PDSCH messages; and transmitting, to the network entity, one or more fallback HARQ feedback indications associated with the one or more multicast PDSCH messages, in lieu of transmitting the semi-static HARQ feedback codebook, in accordance with the configuration information and associated with at least one of the RNTI or a feedback configuration associated with the RNTI, wherein feedback is reported for the one or more multicast PDSCH messages based at least in part on the one or more multicast PDSCH messages being received during a feedback window, wherein the feedback window is based at least in part on a quantity of time resources indicated in the DCI message having the DCI format 4_1.

17. The method of claim 16, wherein the value of semi-static is for multicast.

18. The method of claim 16, wherein the semi-static HARQ feedback codebook is associated with the feedback window, wherein the DCI message having the DCI format 4_1 is received during the feedback window, wherein the RNTI is a group common RNTI (G-RNTI), and wherein transmitting the one or more fallback HARQ feedback indications comprises:

transmitting a single fallback HARQ feedback indication associated with the one or more multicast PDSCH messages.

19. The method of claim 16, wherein the RNTI is a group common RNTI (G-RNTI), wherein transmitting the one or more fallback HARQ feedback indications is associated with not receiving a physical downlink control channel (PDCCH) message associated with any G-RNTI during the feedback window, and wherein the feedback window is associated with the semi-static HARQ feedback codebook.

20. The method of claim 16, wherein the RNTI is a group common configured scheduling RNTI (G-CS-RNTI), and wherein transmitting the one or more fallback HARQ feedback indications comprises:

transmitting a single fallback HARQ feedback indication associated with the one or more multicast PDSCH messages.

21. The method of claim 16, wherein the one or more multicast PDSCH messages are semi-persistent scheduling (SPS) messages, wherein the RNTI is a group common configured scheduling RNTI (G-CS-RNTI), wherein transmitting the one or more fallback HARQ feedback indications is associated with not receiving another multicast message associated with any G-CS-RNTI during the feedback window, and wherein the feedback window is associated with the semi-static HARQ feedback codebook.

22. The method of claim 16, wherein the feedback configuration indicates whether feedback for the RNTI is enabled or disabled, and wherein transmitting the one or more fallback HARQ feedback indications is associated with the feedback for the RNTI being enabled.

23. The method of claim 16, wherein the feedback configuration indicates whether the RNTI is associated with ACK and negative ACK (NACK) (ACK/NACK) feedback or NACK only feedback, and wherein transmitting the one or more fallback HARQ feedback indications is associated with the RNTI being associated with the ACK/NACK feedback.

24. The method of claim 16, wherein the one or more multicast PDSCH messages include dynamic grant multicast messages or semi-persistent scheduling (SPS) multicast messages.

25. A method of wireless communication performed by a network entity, comprising:

transmitting configuration information, for one or more user equipments (UEs), associated with a semi-static hybrid automatic repeat request (HARQ) feedback codebook for multicast messages, wherein the configuration information comprises an indication of a physical downlink shared channel (PDSCH) HARQ acknowledgement (ACK) codebook field with a value of semi-static;

transmitting a downlink control information (DCI) message having a DCI format 4_1, for the one or more UEs, associated with a radio network temporary identifier (RNTI), scheduling one or more multicast PDSCH messages; and receiving one or more fallback HARQ feedback indications, for a UE of the one or more UEs, associated with the one or more multicast PDSCH messages, in lieu of receiving the semi-static HARQ feedback codebook, in accordance with the configuration information and associated with at least one of the RNTI or a feedback configuration associated with the RNTI, wherein feedback is reported for the one or more multicast PDSCH messages based at least in part on the one or more multicast PDSCH messages being received during a feedback window, wherein the feedback window is based at least in part on a quantity of time resources indicated in the DCI message having the DCI format 4_1.

26. The method of claim 25, wherein the value of semi-static is for multicast.

27. The method of claim 25, wherein the semi-static HARQ feedback codebook is associated with the feedback window, wherein the DCI message having the DCI format 4_1 is transmitted during the feedback window, wherein the RNTI is a group common RNTI (G-RNTI), and wherein receiving the one or more fallback HARQ feedback indications comprises:

receiving a single fallback HARQ feedback indication associated with the one or more multicast PDSCH messages.

28. The method of claim 25, wherein the RNTI is a group common configured scheduling RNTI (G-CS-RNTI), and wherein receiving the one or more fallback HARQ feedback indications comprises:

receiving a single fallback HARQ feedback indication associated with the one or more multicast PDSCH messages.

29. The method of claim 25, wherein the feedback configuration indicates whether feedback for the RNTI is enabled or disabled, and wherein receiving the one or more fallback HARQ feedback indications is associated with the feedback for the RNTI being enabled.

30. The method of claim 25, wherein the feedback configuration indicates whether the RNTI is associated with ACK and negative ACK (NACK) (ACK/NACK) feedback or NACK only feedback, and wherein receiving the one or more fallback HARQ feedback indications is associated with the RNTI being associated with the ACK/NACK feedback.

* * * * *